(12) United States Patent
Zheng et al.

(10) Patent No.: US 12,388,107 B2
(45) Date of Patent: Aug. 12, 2025

(54) DOCKING APPARATUS, BATTERY PRODUCTION LINE, AND BATTERY CELL LOADING METHOD

(71) Applicant: CONTEMPORARY AMPEREX TECHNOLOGY CO., LIMITED, Ningde (CN)

(72) Inventors: Panze Zheng, Ningde (CN); Yanjun Xu, Ningde (CN); Yule Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 88 days.

(21) Appl. No.: 18/511,723

(22) Filed: Nov. 16, 2023

(65) Prior Publication Data
US 2024/0429427 A1    Dec. 26, 2024

Related U.S. Application Data

(63) Continuation of application No. PCT/CN2023/101438, filed on Jun. 20, 2023.

(51) Int. Cl.
*H01M 10/04* (2006.01)
*B25J 9/16* (2006.01)
*B65G 47/04* (2006.01)
*B65G 61/00* (2006.01)

(52) U.S. Cl.
CPC ....... *H01M 10/0404* (2013.01); *B25J 9/1682* (2013.01); *B65G 47/04* (2013.01); *B65G 61/00* (2013.01)

(58) Field of Classification Search
None
See application file for complete search history.

(56) References Cited

U.S. PATENT DOCUMENTS

| 4,460,304 A * | 7/1984 | Dombach | B65G 47/52 198/374 |
| 6,557,692 B2 * | 5/2003 | Runonen | B65G 47/52 414/773 |
| 6,652,014 B2 * | 11/2003 | Schmalz | B25J 15/0616 414/737 |

(Continued)

FOREIGN PATENT DOCUMENTS

| CN | 107046147 A * | 8/2017 | ........ H01M 10/0404 |
| CN | 111285099 A | 6/2020 | |

(Continued)

OTHER PUBLICATIONS

The World Intellectual Property Organization (WIPO) International Search Report for PCT/CN2023/101438 Nov. 24, 2023 5 Pages (including translation).

(Continued)

*Primary Examiner* — Kavel Singh
(74) *Attorney, Agent, or Firm* — ANOVA LAW GROUP, PLLC

(57) ABSTRACT

A docking apparatus includes a first docking mechanism. The first docking mechanism includes a first base, a first flipping assembly, and a first gripper assembly, where the first flipping assembly is configured to be capable of driving the first gripper assembly to flip over to a first attitude or a second attitude.

20 Claims, 9 Drawing Sheets

(56) References Cited

U.S. PATENT DOCUMENTS

| | | | | |
|---|---|---|---|---|
| 9,498,887 | B1 * | 11/2016 | Zevenbergen | ........ B25J 15/0052 |
| 10,717,607 | B2 * | 7/2020 | McBride | ................. B24C 3/086 |

FOREIGN PATENT DOCUMENTS

| | | | | |
|---|---|---|---|---|
| CN | 112331900 A | * | 2/2021 | ........ H01M 10/0404 |
| CN | 213444911 U | | 6/2021 | |
| CN | 214012994 U | | 8/2021 | |
| CN | 113346121 B | | 6/2022 | |
| CN | 217102027 U | | 8/2022 | |
| CN | 217626325 U | | 10/2022 | |
| CN | 217971496 U | | 12/2022 | |
| WO | 2022067873 A1 | | 4/2022 | |

OTHER PUBLICATIONS

The European Patent Office (EPO) The Extended European Search Report for Application No. 23809948.5, Jul. 18, 2024 9 Pages.

\* cited by examiner

Dock battery cells, where a gripping device grips battery cells from outside and places them into a docking apparatus, and the docking apparatus moves and flips over the battery cells onto corresponding conveyor lines Pre-stack the battery cells, where a stacking apparatus pre-stacks the battery cells on the conveyor lines Replenish a battery cell, where when the number of battery cells pre-stacked by the stacking apparatus on any one of the conveyor lines reaches a predetermined value, the gripping device grips a battery cell from outside and places it into the docking apparatus, and the docking apparatus moves and flips over the battery cell onto the conveyor line

FIG. 9

DOCKING APPARATUS, BATTERY PRODUCTION LINE, AND BATTERY CELL LOADING METHOD

CROSS-REFERENCE TO RELATED APPLICATION

This application is a continuation of International Application No. PCT/CN2023/101438, filed on Jun. 20, 2023, the entire content of which is incorporated herein by reference.

TECHNICAL FIELD

This application relates to the field of battery production technologies, and in particular relates to a docking apparatus, a battery production line, and a battery cell loading method.

BACKGROUND

In a battery production line, battery cells need to be attitude-flipped and moved to a conveyor line for a subsequent production process. In the related art, at least two manipulators are used to perform the attitude flipping and moving operations, where one manipulator performs a gripping action on battery cells, and another manipulator receives the battery cells from the manipulator performing the gripping action, performs a flipping action, and then places the battery cells onto the conveyor line. The use of a plurality of manipulators to perform the actions of gripping, flipping, and placing step by step results in a lower loading efficiency of the battery cells, which in turn affects the efficiency of battery production.

SUMMARY

An objective of embodiments of this application is to provide a docking apparatus, a battery production line, and a battery cell loading method, aiming to address the technical issue of low efficiency in loading battery cells onto a conveyor line.

The following technical solutions are used in the embodiments of this application.

According to a first aspect, an embodiment of this application provides a docking apparatus. The docking apparatus is configured to load a battery cell onto a conveyor line. The docking apparatus includes a first docking mechanism. The first docking mechanism includes a first base, a first flipping assembly, and a first gripper assembly, where the first flipping assembly is provided on the first base, the first gripper assembly is provided on the first flipping assembly, the first flipping assembly is configured to be capable of driving the first gripper assembly to flip over to a first attitude or a second attitude, and the first gripper assembly grips the battery cell in the first attitude and loads the battery cell onto the conveyor line in the second attitude. The preceding technical solution in this embodiment of this application has at least the following technical effects or advantages.

With the docking apparatus provided in this embodiment of this application, an external battery cell can be loaded into the first gripper assembly in the first attitude, the first gripper assembly can clamp the battery cell loaded, the first flipping assembly can drive the first gripper assembly to flip over to the second attitude to cause the battery cell to be flipped over synchronously for attitude adjustment, and the first gripper assembly can release the battery cell to allow the battery cell to fall onto the conveyor line after the attitude adjustment, so as to perform the attitude flipping on the battery cell and move it onto the conveyor line. The docking apparatus of this embodiment of this application can grip the battery cell loaded, perform attitude flipping, and then load the battery cell onto the conveyor line, so it can take place of a plurality of manipulators to load the battery cell. This effectively improves the efficiency of loading battery cells onto the conveyor line, and thus ensures the efficiency of battery production.

In some embodiments, the first gripper assembly is configured to grip the battery cell along a thickness direction of the battery cell.

With the preceding technical solution used, the first gripper assembly can clamp the battery cell in the thickness direction of the battery cell, in other words, a width of the battery cell does not affect the clamping operation of the first gripper assembly, such that the first gripper assembly can clamp battery cells of a variety of width sizes, and the compatibility of the first gripper assembly can be effectively improved.

In some embodiments, the first docking mechanism further includes a first mobile assembly, where the first mobile assembly is provided on the first base, the first flipping assembly is provided on the first mobile assembly, and the first mobile assembly is configured to be capable of driving the first flipping assembly to move.

With the preceding technical solution used, when the first gripper assembly in the first attitude clamps the battery cell, the first mobile assembly can drive the first flipping assembly and the first gripper assembly to move, and the battery cell clamped by the first gripper assembly can move synchronously, such that the battery cell can move to a predetermined position, and when the first flipping assembly drives the first gripper assembly to flip over to the second attitude, the first gripper assembly can more accurately place the clamped battery cell onto the corresponding conveyor line.

In some embodiments, the first mobile assembly includes a mobile frame, a first mobile drive member, and a second mobile drive member, where the mobile frame is movably connected to the first base, and the first flipping assembly is movably connected to the mobile frame; the first mobile drive member is provided on the first base, and an output end of the first mobile drive member is connected to the mobile frame; and the second mobile drive member is provided on the mobile frame, and an output end of the second mobile drive member is connected to the first flipping assembly; where an output direction of the first mobile drive member intersects with an output direction of the second mobile drive member.

With the preceding technical solution used, the first mobile drive member can drive the mobile frame to move relative to the first base, such that the first flipping assembly synchronously moves with the mobile frame, the second mobile drive member can drive the first flipping assembly to move relative to the mobile frame, and in addition, the output direction of the first mobile drive member intersects with the output direction of the second mobile drive member, in other words, the first flipping assembly can move in at least two directions, such that the first gripper assembly can clamp the battery cell to move in at least two directions. This effectively extends the range of movement adjustment for the battery cell by the first gripper assembly.

In some embodiments, the output direction of the first mobile drive member is perpendicular to the output direction of the second mobile drive member, and the first mobile drive member is configured to be capable of driving the mobile frame to move in the direction of gravity.

With the preceding technical solution used, the first mobile drive member can drive the mobile frame to move in the direction of gravity, so as to drive the first flipping assembly and the first gripper assembly to move in the direction of gravity closer to or away from the conveyor line, and the output direction of the second mobile drive member is perpendicular to the output direction of the first mobile drive member, such that the second mobile drive member can adjust positions of the first gripper assembly and the battery cell clamped by the first gripper assembly in a direction perpendicular to the direction of gravity.

In some embodiments, the first mobile assembly further includes a first guide member and a second guide member, where the first guide member is provided on the first base, the mobile frame is connected to the first guide member, the mobile frame is configured to be capable of sliding along the first guide member, the second guide member is provided on the mobile frame, and the first flipping assembly is configured to be capable of sliding along the second guide member.

With the preceding technical solution used, the mobile frame can slide along the first guide member under the driving of the first mobile drive member, effectively improving the stability of the mobile frame during movement, and the first flipping assembly can slide along the second guide member under the driving of the second mobile drive member, effectively improving the stability of the first flipping assembly during movement, thereby improving the stability of the first gripper assembly when the first gripper assembly clamps the battery cell to move.

In some embodiments, the first flipping assembly includes a support base, a flipping drive structure, and a flipping shaft, where the support base is provided on the first base, the flipping drive structure is provided on the support base, the flipping shaft is connected to an output shaft of the flipping drive structure, the flipping drive structure is configured to drive the flipping shaft to rotate, and the first gripper assembly is fixedly connected to the flipping shaft.

With the preceding technical solution used, the flipping drive structure can drive the flipping shaft to rotate, such that the first gripper assembly rotates with the flipping shaft synchronously, and the first gripper assembly can rotate to a first attitude or a second attitude, so as to realize attitude flipping of the battery cells clamped by the first gripper assembly.

In some embodiments, the first flipping assembly further includes a mounting bearing, where the mounting bearing is provided on the support base, and the flipping shaft is threaded through and rotationally connected to the mounting bearing.

With the preceding technical solution used, the flipping shaft can be provided on the support base through the mounting bearing, effectively improving the stability of the mounting of the flipping shaft; and the flipping drive structure can drive the flipping shaft to rotate on the mounting bearing.

In some embodiments, the flipping drive structure includes a telescopic drive member and a connecting block, where the connecting block is fixedly connected to the flipping shaft, the telescopic drive member is hingedly connected to the support base, and the output end of the telescopic drive member is hingedly connected to the connecting block.

With the preceding technical solution used, the telescopic drive member can drive the connecting block through telescoping of the output end of the telescopic drive member to make the connecting block rotate around the flipping shaft, and the connecting block can also drive the flipping shaft to synchronously rotate during rotation, so as to drive the first gripper assembly to synchronously rotate around the flipping shaft.

In some embodiments, the connecting block protrudes towards the telescopic drive member to form an avoidance portion, and the output end of the telescopic drive member is hingedly connected to the avoidance portion.

With the preceding technical solution used, the output end of the telescopic drive member is hingedly connected to the avoidance portion, the telescopic drive member can drive the avoidance portion to rotate, and the avoidance portion protruding towards the telescopic drive member can expand the output range of the telescopic drive member, such that the telescopic drive member can drive the flipping shaft to rotate in a larger angle, and thus the first gripper assembly has a larger range of movement and the battery cell also has a larger attitude adjustment range.

In some embodiments, the first flipping assembly further includes a buffer block and a buffer limiting member, where the buffer block is provided on the flipping shaft, the buffer limiting member is provided on the support base, and the buffer limiting member is configured to abut against the buffer block when the first gripper assembly has flipped over to the first attitude and/or the second attitude under driving of the flipping shaft.

With the preceding technical solution used, when the flipping shaft drives the first gripper assembly to flip over to the first attitude and/or the second attitude, the buffer block provided on the flipping shaft can abut against the buffer limiting member, such that the buffer limiting member can provide buffer for the buffer block when the first gripper assembly flips over to the first attitude and/or the second attitude, and thus the first gripper assembly can switch to the first attitude and/or the second attitude more smoothly.

In some embodiments, the first flipping assembly further includes a controller and a position sensor, where the controller is electrically connected to the position sensor and the flipping drive structure, the position sensor is provided on the support base, and the position sensor is configured to be capable of sensing the movement of the first gripper assembly to the first attitude and/or the second attitude.

With the preceding technical solution used, the position sensor can sense whether the first gripper assembly has moved to the first attitude and/or the second attitude in place, and if the first gripper assembly does not move to the first attitude and/or the second attitude in place, the position sensor can transmit an electrical signal to the controller, such that the controller can control the flipping drive structure to drive the flipping shaft to continue to rotate.

In some embodiments, the first gripper assembly includes a holder, a gripper drive member, a gripper body, and a gripper fixing member, where the holder is connected to the first flipping assembly, the gripper drive member is provided on the holder, the gripper body is connected to an output end of the gripper drive member, the gripper fixing member is connected to the holder, and the gripper drive member is configured to be capable of driving the gripper body to reciprocate towards the gripper fixing member.

With the preceding technical solution used, the gripper drive member can drive the gripper body to move in the direction towards the gripper fixing member so as to realize the purpose of clamping the battery cell, and the holder is connected to the first flipping assembly, such that the first flipping assembly can drive the holder to flip over, allowing the gripper body and the gripper fixing member to clamp the battery cell and flip over the battery cell for attitude adjustment.

In some embodiments, the gripper body and the gripper fixing member are configured to grip two opposite end faces of the battery cell in the thickness direction of the battery cell.

With the preceding technical solution used, the gripper body and the gripper fixing member can clamp the two opposite end faces of the battery cell in the thickness direction, and the width of the battery cell has no effect on the clamping effect of the gripper body and the gripper fixing member, so the gripper body and the gripper fixing member can clamp battery cells of a variety of width specifications. This effectively improves the applicability of the first gripper assembly.

In some embodiments, the gripper body includes a first clamping block, a second clamping block, and a resilient buffer member, where the first clamping block is connected to an output end of the gripper drive member, the second clamping block is slidably connected to the first clamping block along an output direction of the gripper drive member, the resilient buffer member is provided between the first clamping block and the second clamping block, and two opposite ends of the resilient buffer member abut against the first clamping block and the second clamping block, respectively.

With the preceding technical solution used, the resilient buffer member is provided between the first clamping block and the second clamping block, such that the resilient buffer member can provide buffering when the action of clamping the battery cell is performed, so as to reduce damage caused by overpressure to the battery cell.

In some embodiments, the holder is provided with a support portion, where the support portion is configured to be capable of bearing the battery cell, and the gripper fixing member is connected to the support portion.

With the preceding technical solution used, the battery cell can be placed on the support portion, and the battery cell can be clamped by the gripper body and the gripper fixing member, so as to improve the stability of the battery cell when the battery cell is clamped.

In some embodiments, an end of the gripper body facing the gripper fixing member is covered with a first insulating member, an end of the gripper fixing member facing the gripper body is covered with a second insulating member, and an end face of the support portion on one side used to bear the battery cell is covered with a third insulating member.

With the preceding technical solution used, the first insulating member, the second insulating member, and the third insulating member are in direct contact with the battery cell when the battery cell is clamped, thereby effectively reducing the probability of electric leakage.

In some embodiments, at least one of the first insulating member, the second insulating member, and the third insulating member is flexible.

With the preceding technical solution used, at least one of the first insulating member, the second insulating member, and the third insulating member is flexible, such that the at least one of the first insulating member, the second insulating member, and the third insulating member can reduce the probability of causing damage to the battery cell when the battery cell is clamped.

In some embodiments, the first flipping assembly is provided in plurality, and the first flipping assemblies each are provided with the same number of the first gripper assemblies.

With the preceding technical solution used, the first gripper assemblies provided on the plurality of the first flipping assemblies can simultaneously clamp external battery cells loaded, and the plurality of the first flipping assemblies can simultaneously drive the first gripper assemblies to flip and load the battery cells to corresponding conveyor lines, effectively improving the efficiency of flipping and loading the battery cells, thereby improving the overall efficiency of the battery production line.

In some embodiments, the docking apparatus further includes a second docking mechanism, where the first docking mechanism and the second docking mechanism both are located on a conveying path of the conveyor line; the second docking mechanism includes a second base, a second mobile assembly, a second flipping assembly, and a second gripper assembly; and the first docking mechanism includes N first flipping assemblies, and the second docking mechanism includes less than N second flipping assemblies, where N is the number of the conveyor lines, and N is an integer greater than or equal to 2.

With the preceding technical solution used, the N first flipping assemblies on the first docking mechanism can be used to simultaneously load the attitude-flipped battery cells to the N conveyor lines, effectively improving the efficiency of loading the battery cells onto the conveyor lines; and in addition, the less than N second flipping assemblies on the second docking mechanism can be used to perform replenishment and configuration operations on one or more conveyor lines that are lack of materials. This realizes the configuration of the number of battery cells on different conveyor lines while guaranteeing the efficiency of loading the battery cells onto the conveyor lines.

In some embodiments, the first flipping assembly is provided in a quantity of two, and the second flipping assembly is provided in a quantity of one.

With the preceding technical solution used, the two first flipping assemblies can be used to drive the first gripper assemblies thereon for flipping and loading, and the second flipping assembly can be used to drive the second gripper assembly thereon for flipping and replenishment, such that the first flipping assemblies and the first gripper assemblies can guarantee the loading efficiency and the second flipping assembly and the second gripper assembly can perform a replenishment operation for the conveyor line, so as to ensure that the conveyor lines each have sufficient battery cells to avoid affecting the subsequent processes.

According to a second aspect, an embodiment of this application provides a battery production line including the foregoing docking apparatus, a gripping device, a conveyor line, and a stacking apparatus, where the gripping device is configured to transfer a battery cell to a first gripper assembly in a first attitude, and the conveyor line is configured to transfer the battery cell released by the first gripper assembly in a second attitude, the stacking apparatus is provided downstream of the docking apparatus in a conveying direction of the conveyor line, and the stacking apparatus is configured to be capable of pre-stacking battery cells on the conveyor line.

The preceding technical solution in this embodiment of this application has at least the following technical effects or advantages.

With the battery production line provided in this embodiment of this application, the gripping device can load external battery cells to the docking apparatus, the first gripper assembly of the docking apparatus clamps the battery cells in the first attitude, and the first gripper assembly can load the battery cells onto corresponding conveyor lines after flipping over to the second attitude, implementing adjustment of the attitude of the battery cells and loading of the battery cells onto the conveyor lines; and the stacking apparatus can perform a pre-stacking operation on battery cells downstream in the conveying direction of the conveyor line. The battery production line of this embodiment of this application includes the foregoing docking apparatus, and on the basis that the docking apparatus has a better loading efficiency, the battery production line of this embodiment of this application has a better loading efficiency, such that the production efficiency of the battery production line can be improved.

In some embodiments, the gripping device includes a plurality of gripping assemblies, the conveyor line is provided in plurality, and the number of the gripping assemblies is the same as the number of the conveyor lines.

With the preceding technical solution used, the plurality of gripper assemblies can simultaneously grip a plurality of sets of battery cells, and load the plurality of sets of battery cells onto the first gripper assemblies of the plurality of first flipping assemblies, such that the plurality of first flipping assemblies can drive the corresponding first gripper assemblies to flip over and load the materials to corresponding conveyor lines, effectively improving the loading efficiency.

According to a third aspect, an embodiment of this application provides a battery cell loading method, where the loading method is applied to the foregoing battery production line, and the loading method includes:

docking battery cells, where a gripping device grips battery cells from outside and places them into a docking apparatus, and the docking apparatus moves and flips over the battery cells onto corresponding conveyor lines;

pre-stacking the battery cells, where a stacking apparatus pre-stacks the battery cells on the conveyor lines; and replenishing battery cells, where when the number of battery cells pre-stacked by the stacking apparatus on any one of the conveyor lines reaches a predetermined value, the gripping device grips a battery cell from outside and places it into the docking apparatus, and the docking apparatus moves and flips over the battery cell onto the conveyor line.

The preceding technical solution in this embodiment of this application has at least the following technical effects or advantages.

With the battery cell loading method provided in this embodiment of this application, the stacking apparatus pre-stacks battery cells on conveyor lines. When the number of battery cells stacked by the stacking apparatus according to the configuration reaches a predetermined value, the number of battery cells on one conveyor line is less than the number of battery cells on another conveyor line. In this case, a battery cell can be gripped by the gripping device from outside and put into the docking apparatus, and the docking apparatus moves the battery cell and flips it over onto the conveyor line so as to implement battery cell replenishment. Such configuration of the numbers of battery cells on the conveyor lines avoids affecting the pre-stacking process.

In some embodiments, the docking apparatus includes a first docking mechanism and a second docking mechanism, where the first docking mechanism includes N first flipping assemblies, the flipping assemblies each are provided with the same number of first gripper assemblies, the second docking mechanism includes one second flipping assembly, and the second flipping assembly is provided with several second gripper assemblies;

in the step of docking battery cells, the gripping device grips battery cells from outside and places them into the first gripper assemblies in a first attitude, the first gripper assemblies flip over to a second attitude, and the first gripper assemblies place the battery cells onto corresponding conveyor lines; and in the step of replenishing battery cells, the gripping device grips a battery cell from outside and places it into the second gripper assembly in a first attitude, the second gripper assembly flips over to a second attitude, and the second gripper assembly places the battery cell onto a conveyor line on which the number of the battery cells pre-stacked has reached a predetermined value.

With the preceding technical solution used, the first docking mechanism can use N first flipping assemblies to simultaneously flip battery cells over for loading the battery cells onto N conveyor lines, so as to guarantee the loading efficiency of the battery cells. In addition, the second docking mechanism can use one second flipping assembly to perform loading on any one conveyor line with a smaller number of battery cells according to the configuration, such that the second flipping assembly drives the second gripper assemblies to flip over to perform replenishment according to the configuration while guaranteeing the loading efficiency of the battery cells. This effectively improves the production efficiency of the batteries.

BRIEF DESCRIPTION OF DRAWINGS

To describe the technical solutions in the embodiments of this application more clearly, the following briefly describes the accompanying drawings required for describing the embodiments or related art. Apparently, the accompanying drawings in the following description show merely some embodiments of this application, and persons of ordinary skill in the art may still derive other drawings from these accompanying drawings without creative efforts.

FIG. 9 is a flowchart of a battery cell loading method according to some embodiments of this application.

Figure 1:
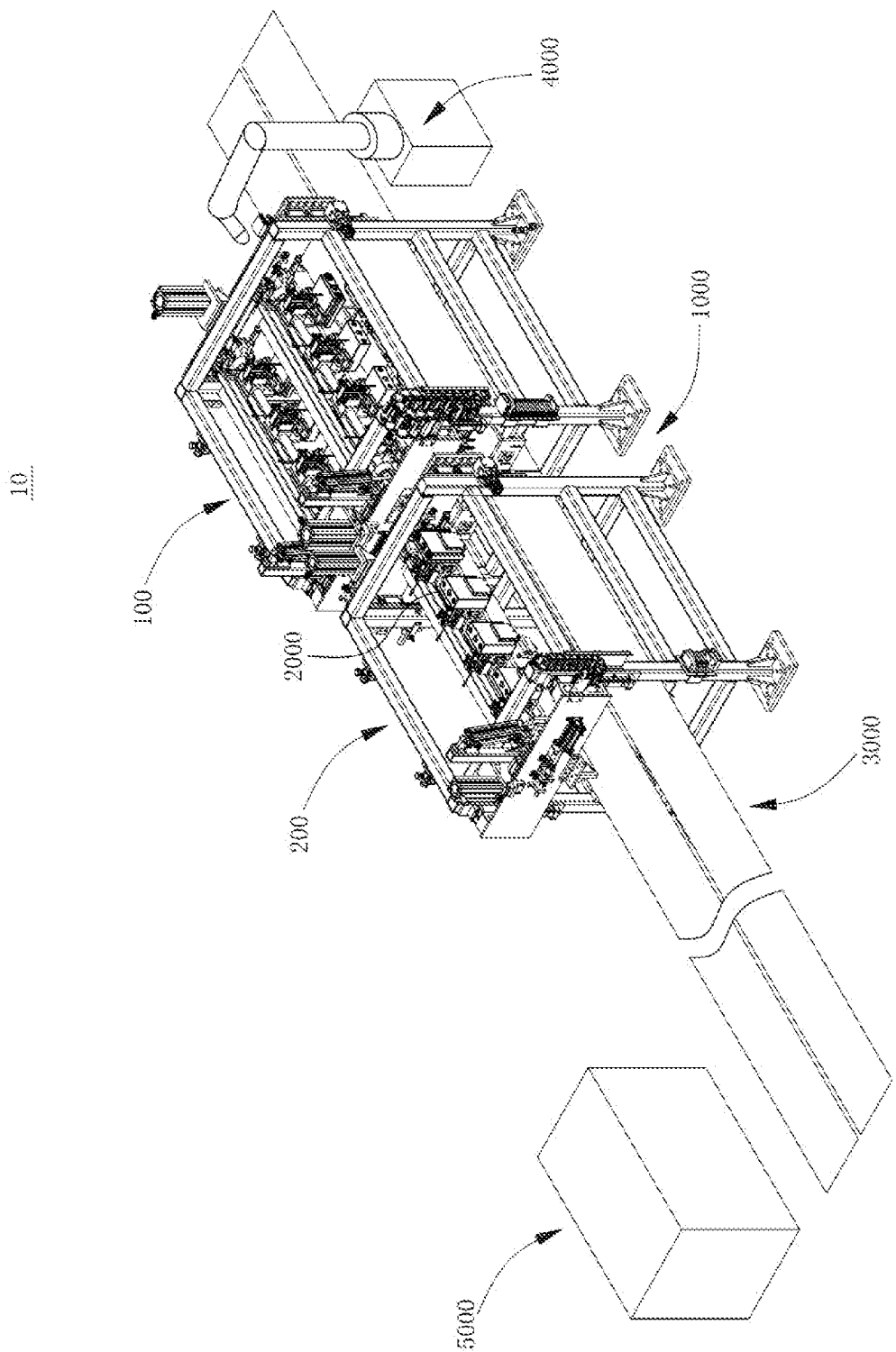
FIG. 1 is a schematic structural diagram of a docking apparatus according to some embodiments of this application.

REFERENCE SIGNS IN THE FIGURES 10. battery production line;
1000. docking apparatus; 2000. battery cell; 3000. conveyor line; 4000. gripping device; 5000. stacking apparatus;
100. first docking mechanism; 110. first base;
120. first mobile assembly; 121. mobile frame; 122. first mobile drive member; 123. second mobile drive member; 124. first guide member; 125. second guide member;
130. first flipping assembly; 131. support base; 132. flipping drive structure; 1321. telescopic drive member; 1322. connecting block; 13221. avoidance portion; 133. flipping shaft; 134. mounting bearing; 135. buffer block; 136. buffer limiting member; 137. position sensor;
140. first gripper assembly; 141. holder; 1411. fixing block; 14111. arc-shaped groove; 1412. fixing plate; 1413. support portion; 1414. limiting structure; 142. gripper drive member; 143. gripper body; 1431. first clamping block; 1432. second clamping block; 1433. resilient buffer member; 144. gripper fixing member; 145. first insulating member; 146. second insulating member; 147. third insulating member;
200. second docking mechanism; 210. second base; 220. second mobile assembly; 230. second flipping assembly; and 240. second gripper assembly.

DESCRIPTION OF EMBODIMENTS

The embodiments of this application are described in detail below. Examples of the embodiments are shown in the accompanying drawings, and the same or similar reference signs indicate the same or similar components or components with the same or similar functions. The embodiments described below with reference to the drawings are exemplary and aim to explain this application, but cannot be understood as a limitation of this application.

Unless otherwise defined, meanings of all technical and scientific terms used in this specification are the same as those commonly understood by persons skilled in the art of this application. The terms used in this specification are merely intended to describe specific embodiments, but not to limit this application. The terms "comprise", "include", and any variants thereof in the descriptions of the specification, claims, and accompanying drawings of this application are intended to cover a non-exclusive inclusion.

In the descriptions of this application, orientations or position relationships indicated by the terms "length", "width", "thickness", "inside", "outside", "up", "down", "front", "left", "right", and the like are based on orientations or position relationships shown in the accompanying drawings, and are merely intended to simplify description of this application for a purpose of easy description, rather than indicating or implying that an apparatus or a part must have a particular direction or must be constructed and operated in a particular orientation. Therefore, this shall not be construed as any limitation on this application.

The terms "first", "second", and the like are merely for the purpose of description, and shall not be understood as any indication or implication of relative importance or any implicit indication of the number of technical features indicated. For example, the first guide member and the second guide member are merely intended to distinguish between different guide members and not to limit their order of precedence, and the first guide member may also be named the second guide member and the second guide member may also be named the first guide member, without departing from the scope of the various described embodiments. The terms "first", "second", and the like do not limit the difference in the characteristics indicated.

In the description of the embodiments of this application, unless otherwise specified and defined explicitly, the terms "connection", "join", and the like should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skills in the art can understand specific meanings of these terms in this application as appropriate to specific situations. The term "the plurality of" means at least two, that is, two and more than two.

The term "and/or" in this application is only an associative relationship for describing associated objects, indicating that three relationships may be present. For example, A and/or B may indicate three cases: presence of only A; presence of both A and B; and presence of only B. In addition, a character "/" in this specification generally indicates an "or" relationship between contextually associated objects. In this disclosure, the phrases "at least one of A, B, and C" and "at least one of A, B, or C" both mean only A, only B, only C, or any combination of A, B, and C.

It should be noted that, in this application, words such as "in some embodiments", "in an example", and "for example" are used to represent an example, an instance, or an illustration. Any embodiment or design solution described by using "in some embodiments", "in an example", or "for example" in this application should not be explained as being more preferred or having more advantages than another embodiment or design solution. Rather, the words such as "in some embodiments", "in an example", or "for example" used are intended to present relevant concepts in a specific manner, meaning that particular features, structures, or characteristics described with reference to an embodiment may be included in at least one embodiment of this application. The preceding words appearing in various positions in the specification do not necessarily refer to the same embodiment or an independent or alternative embodiment that is exclusive of other embodiments. Persons skilled in the art explicitly and implicitly understand that the embodiments described herein may combine with another embodiment.

To make the objectives, technical solutions, and advantages of this application clearer and more comprehensible, the following further describes this application in detail with reference to the accompanying drawings and embodiments.

As the market demand for batteries continues to expand, the production and use of battery products also continue to rise. In the production and assembly processes of a battery, a loading operation needs to be performed on a battery cell. An external battery cell is loaded onto a conveyor line and conveyed through the conveyor line for various processes, and ultimately a finished battery is obtained. In the battery cell loading process, the external battery cell is generally stored upright, to be specific, electrode terminals of the battery cell are placed upwards in the direction of gravity; and when the conveyor line conveys the battery cell, the battery cell needs to lie flat for conveying so as to facilitate subsequent processes. In the related art, at least two manipulators are generally used to separately carry out attitude flipping and mobile loading operations of the battery cell, where at least one manipulator is used to clamp an external battery cell, and the other at least one manipulator is used to receive the battery cell clamped by the previous manipulator and flip it over, so as to cause the vertically placed battery cell to be placed onto a conveyor line after being flipped over to a flat lying state. However, the use of a plurality of manipulators to step by step perform operations of clamping battery cells, flipping them over, and loading them to conveyor lines results in a low loading efficiency of the battery cells, which affects the production efficiency of the batteries.

Based on the preceding considerations, to solve the technical problem of low loading efficiency caused by using a plurality of manipulators to step by step perform operations of clamping, flipping, and loading battery cells, a docking apparatus is designed. A first gripper assembly of the docking apparatus picks up and clamps battery cells in a first attitude, and a first flipping assembly is used to drive the first gripper assembly to flip over to a second attitude, such that the battery cells clamped by the first gripper assembly are flipped over. In addition, after the first gripper assembly flips over to the second attitude, the first gripper assembly can release the battery cells to make the battery cells fall onto conveyor lines. In this way, the operations of clamping, flipping, and loading the battery cells can be performed simultaneously in the docking apparatus, effectively reducing loading processes, thereby improving the loading efficiency.

The docking apparatus disclosed in the embodiments of this application may, but is not limited to, be used for flipping and loading operations on battery cells or other parts in a block structure. The docking apparatus disclosed in this application can be used to form a battery production line, which is conducive to improving the loading efficiency of the battery cells.

The battery cell is the smallest unit constituting the battery. The battery cell includes a housing assembly, an electrode assembly, and other functional components. The housing assembly includes an end cover and a housing.

The end cover refers to a component that covers an opening of the housing to isolate internal environment of the battery cell from external environment. The end cover may be provided with functional components such as an electrode terminal. Without limitation, a shape of the end cover may fit with that of the housing, such that the end cover can match the housing. The housing is an assembly configured to form an internal environment of the battery cell together with the end cover, where the formed internal environment may be configured to accommodate the electrode assembly, an electrolyte, and other components.

The housing and the end cover may be independent components, and an opening may be provided in the housing such that the end cover can close the opening to form the internal environment of the battery cell. Without limitation, the end cover and the housing may also be integrated. Specifically, the end cover and the housing may form a shared connection surface before other components are placed inside the housing, and then the end cover covers the housing when the inside of the housing needs to be sealed. The housing may be of various shapes and sizes, such as a rectangular shape, a cylindrical shape, and a hexagonal prism shape. Specifically, the shape of the housing may be determined based on a specific shape and size of the electrode assembly. The housing may be made of a variety of materials, for example, it may, but is not limited to, be made of copper, iron, aluminum, stainless steel, aluminum alloy, and plastic.

For ease of description, the docking apparatus being used in a battery production line is used as an example for illustration in the following embodiment.

The docking apparatus provided in the embodiments of this application is introduced and described below.

Figure 5:
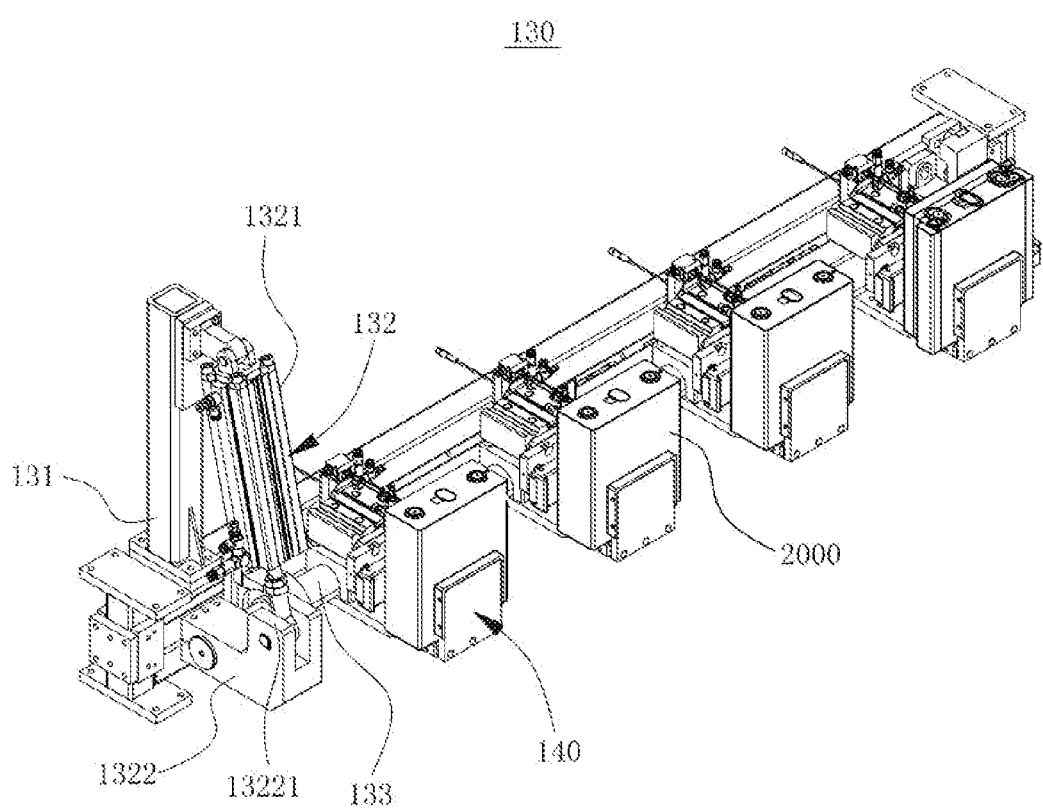
FIG. 5 is a schematic structural diagram of a first flipping assembly driving a first gripper assembly to rotate to a first attitude according to some embodiments of this application.
Figure 6:
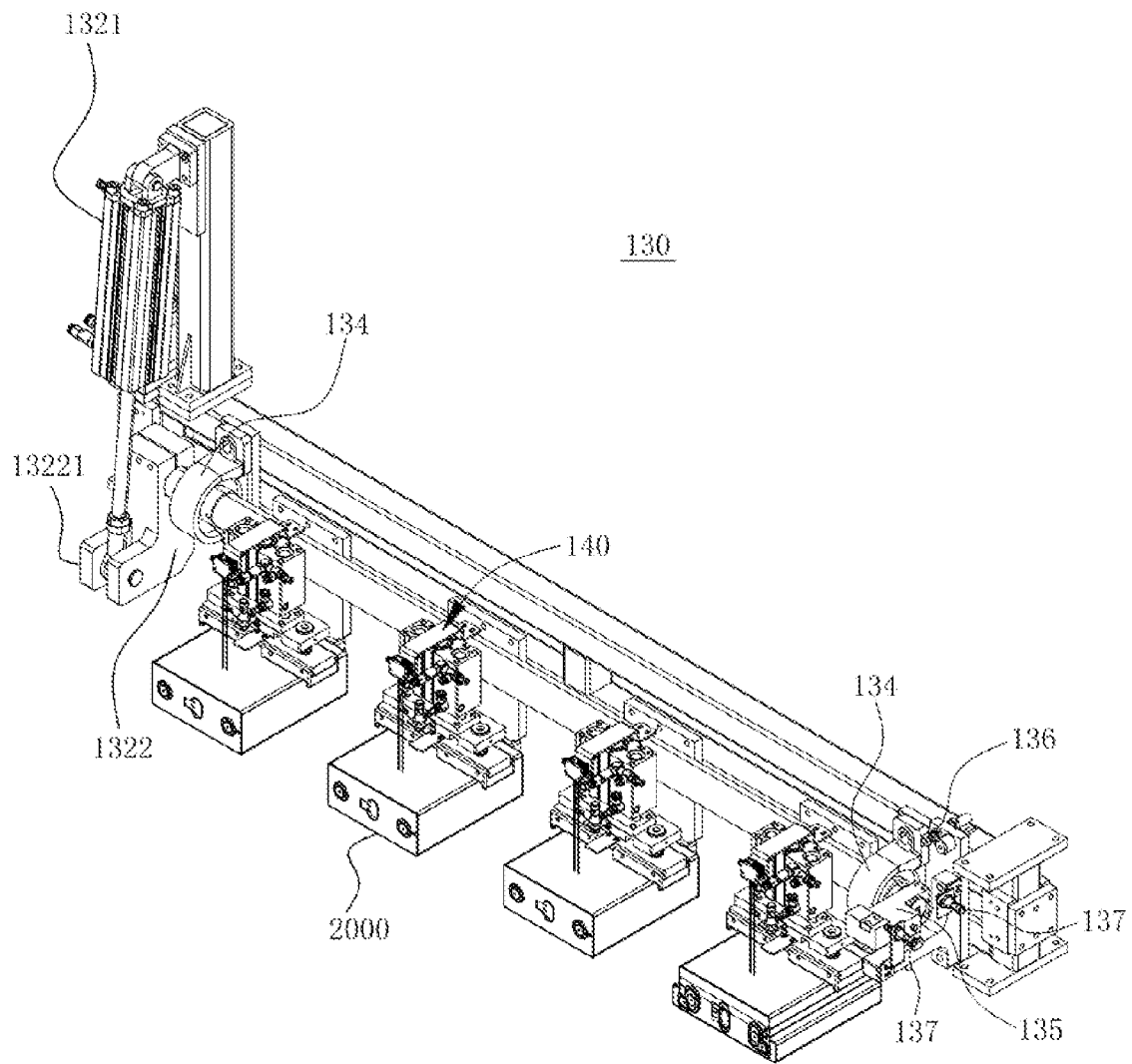
FIG. 6 is a schematic structural diagram of a first flipping assembly driving a first gripper assembly to rotate to a second attitude according to some embodiments of this application.

Referring to FIG. 1, FIG. 5, and FIG. 6, an embodiment of this application provides a docking apparatus 1000. The docking apparatus 1000 is configured to load battery cells 2000 onto a plurality of conveyor lines 3000. The docking apparatus 1000 includes a first docking mechanism 100. The first docking mechanism 100 includes a first base 110, a first flipping assembly 130, and a first gripper assembly 140, where the first flipping assembly 130 is provided on the first base 110, the first gripper assembly 140 is provided on the first flipping assembly 130, the first flipping assembly 130 is configured to be capable of driving the first gripper assembly 140 to flip over to a first attitude or a second attitude, and the first gripper assembly 140 grips the battery cells 2000 in the first attitude and loads the battery cells 2000 onto the conveyor lines 3000 in the second attitude.

The first base 110 is a major structure of the first docking mechanism 100, the first base 110 may be, but is not limited to, a machine tool, a rack, or a frame structure composed of a plurality of profiles.

The first flipping assembly 130 is configured to drive the first gripper assembly 140 to flip over. Specifically, the first flipping assembly 130 may be a drive mechanism for driving extension and retraction, for example, a drive cylinder or a drive hydraulic cylinder, configured to drive the first gripper assembly 140 to flip over; or the first flipping assembly 130 may be a drive mechanism for driving rotation, for example, a motor or a rotary cylinder, configured to drive the first gripper assembly 140 to rotate.

Optionally, the first flipping assembly 130 may be fixedly connected to the first base 110, and the first gripper assembly 140 is driven by the drive structure included in the first flipping assembly 130 to move. For example, the first flipping assembly 130 may include a drive structure such as a drive cylinder or a drive motor, through which the first gripper assembly 140 is driven to flip over. Alternatively, the first flipping assembly 130 may be movably connected to the first base 110, and the first gripper assembly 140 and the clamped battery cells 2000 are driven by the movement of the first flipping assembly 130 relative to the first base 110 to move synchronously.

The first flipping assembly 130 may be provided in a quantity of one or more, and each first flipping assembly 130 may be connected to one or more first gripper assemblies 140. For example, one first flipping assembly 130 may be provided on the first base 110, four groups of first gripper assemblies 140 may be provided on the first flipping assemblies 130, and the first flipping assembly 130 can drive the four first gripper assemblies 140 to synchronously flip over.

The first flipping assembly 130 can drive the first gripper assemblies 140 to flip over to a first attitude or a second attitude, where the first attitude and second attitude are two predetermined attitudes to which the first gripper assemblies 140 are driven by the first flipping assembly 130 to rotate. As shown in FIG. 5 and FIG. 6, FIG. 5 is a schematic structural diagram of the first gripper assembly 140 in the first attitude, in which the first gripper assembly 140 can grip externally-loaded battery cells 2000; and FIG. 6 is a schematic structural diagram of the first gripper assembly 140 in the second attitude, in which the first gripper assembly 140 flips the gripped battery cells 2000 over to a flat lying state, allowing the battery cells 2000 to fall onto the conveyor lines 3000 from the first gripper assembly 140.

For example, in the first attitude, external battery cells 2000 can be placed into the first gripper assembly 140, and the first gripper assembly 140 can clamp the battery cells 2000. It can be understood that the direction in which the first gripper assembly 140 in the first attitude clamps the battery cells 2000 may be the direction opposite to gravity, that is, vertically upward, so as to facilitate the external upright battery cells 2000 to be capable of being placed into the first gripper assembly 140 from above. Specifically, an included angle between the direction in which the battery cells 2000 are gripped and the direction opposite to gravity may be less than 90°. For example, in the first attitude, the direction in which the battery cells 2000 are gripped by the first gripper assembly 140 may be parallel to the direction opposite to gravity, to be specific, in the direction of gravity, the direction in which the first gripper assembly 140 grips the battery cells 2000 is parallel to the direction of gravity and is opposite to the direction of gravity.

It should be understood that in the first attitude, the direction in which the first gripper assembly 140 grips the battery cells 2000 may alternatively be any other direction, to be specific, the battery cells 2000 are not upright when being loaded into the first gripper assembly 140, and at this point, the first flipping assembly 130 can drive the first gripper assembly 140 to flip over to a corresponding attitude for clamping the battery cells 2000. For example, the direction in which the first gripper assembly 140 grips the battery cells 2000 may be substantially perpendicular to the direction of gravity. Alternatively, the direction in which the first gripper assembly 140 grips the battery cells 2000 may be toward the direction of gravity and may form an included angle less than 90° with the direction of gravity.

In the second attitude, the first gripper assembly 140 can drive the battery cells 2000 to adjust their attitude, to be specific, to flip the battery cells 2000 over from an upright state to a flat lying state, and when the first gripper assembly 140 in the second attitude releases the battery cells 2000, the battery cells 2000 can fall out of the first gripper assembly 140 onto the conveyor lines 3000 under their own gravity. In this way, the direction in which the first gripper assembly 140 in the second attitude grips the battery cells 2000 can be substantially perpendicular to the direction of gravity, such that the battery cells 2000 can be adjusted in attitude and can also be moved out of the loosened first gripper assembly 140. For example, in the second attitude, the direction in which the first gripper assembly 140 grips the battery cells 2000 may be perpendicular to the direction of gravity, that is, the horizontal direction.

It can be understood that in this embodiment, the first gripper assembly 140 can be flipped over to, including but not limited to, the first attitude and the second attitude, and the first gripper assembly 140 can flip over to any attitude under the driving of the first flipping assembly 130. In this embodiment, for better description and understanding, the first attitude is used to illustrate the state of the first gripper assembly 140 when it receives external battery cells 2000, and the second attitude is used to illustrate the state of the first gripper assembly 140 when it places the clamped battery cells 2000 onto the conveyor lines 3000.

The first gripper assembly 140 is configured to grip the battery cells 2000, or to release the battery cells 2000 such that the battery cells 2000 in the second attitude can fall out of the first gripper assembly 140 under their own gravity. Specifically, the first gripper assembly 140 may include a clamping block for clamping the battery cells 2000 and a drive structure for driving the clamping block to move. The drive structure is used to drive at least one clamping block to move relative to another clamping block, so as to realize a clamping action. The drive structure may be, but is not limited to, a cylinder, a hydraulic cylinder, a roller-screw drive structure, or a belt-transfer structure.

With the docking apparatus 1000 provided in this embodiment of this application, an external battery cell 2000 can be loaded into the first gripper assembly 140 in a first attitude, the first gripper assembly 140 can clamp the loaded battery cell 2000, the first flipping assembly 130 can drive the first gripper assembly 140 to flip over to the second attitude to cause the battery cell 2000 to be flipped over synchronously for attitude adjustment, and the first gripper assembly 140 can release the battery cell 2000 to allow the battery cell 2000 to fall onto the conveyor line 3000 after the attitude is adjusted, so as to perform the attitude flipping on the battery cell 2000 and move it onto the conveyor line 3000. The docking apparatus 1000 of this embodiment of this application can grip the battery cell 2000 loaded, perform attitude flipping, and then load the battery cell 2000 onto the conveyor line 3000, so it can take place of a plurality of manipulators to load the battery cell 2000. This effectively improves the efficiency of loading battery cells 2000 onto the conveyor line 3000, and thus ensures the efficiency of battery production.

Figure 7:
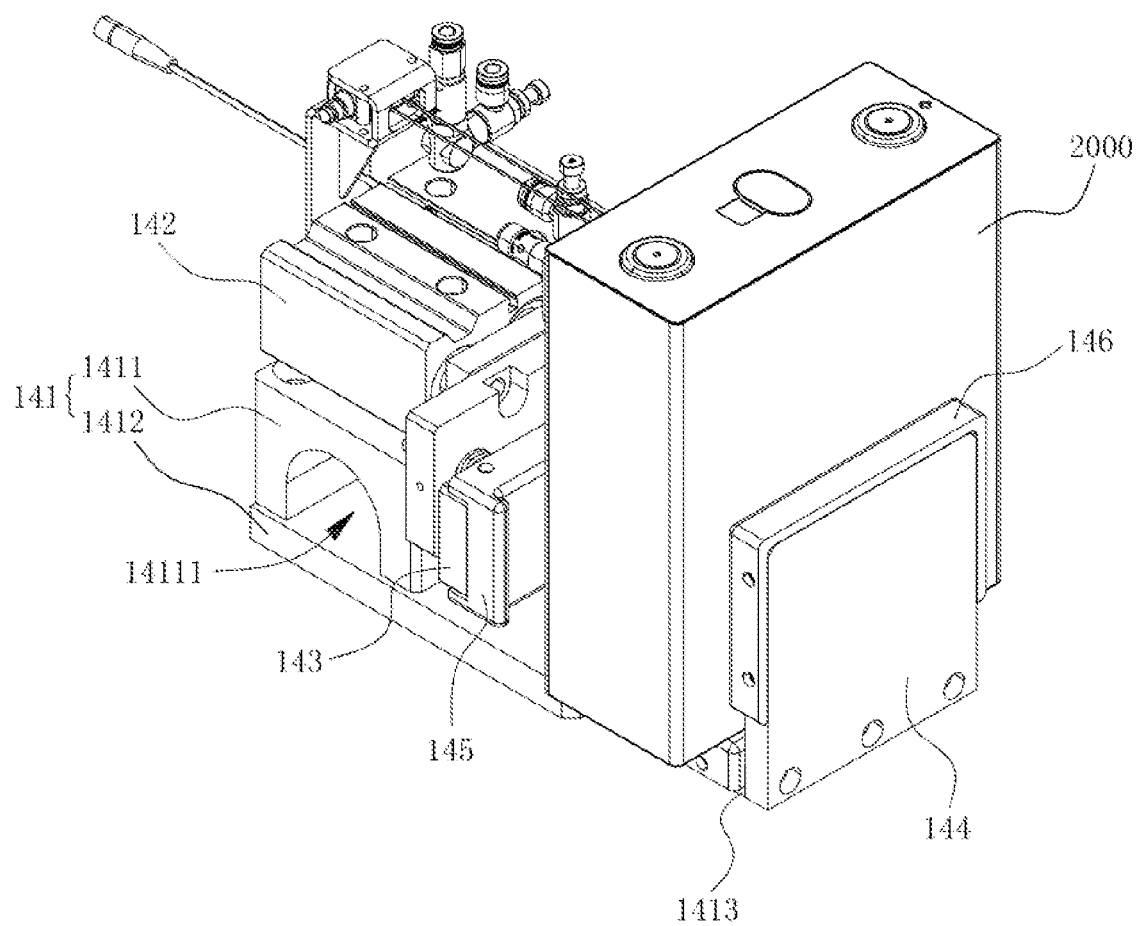
FIG. 7 is a schematic structural diagram of a first gripper assembly according to some embodiments of this application.

Referring to FIG. 1 and FIG. 7, in some embodiments, the first gripper assembly 140 is configured to grip a battery cell 2000 long a thickness direction of the battery cell 2000.

For example, in this embodiment, a housing of the battery cell 2000 being rectangular is used as an example for illustration. The rectangular housing has a thickness, and thus a thickness of the battery cell 2000 is the thickness of the rectangular housing.

With such layout, the first gripper assembly 140 can clamp the battery cell 2000 in the thickness direction of the battery cell 2000, to be specific, the first gripper assembly 140 can clamp two opposite end faces of the battery cell 2000 in the thickness direction. In addition, the first gripper assembly 140 does not interfere with the battery cell 2000 in a width direction of the battery cell 2000, and difference in specifications of the battery cells 2000 is mostly reflected in the width of the battery cell 2000, such that the first gripper assembly 140 can be applied to battery cells 2000 of various widths, eliminating the need to frequently adjust a clamping width of the first gripper assembly 140 due to the difference in specifications of the gripped battery cells 2000, and the first gripper assembly 140 has a wider range of application. Moreover, the two opposite end faces of the battery cell 2000 in the thickness direction are large surfaces, making the clamping more stable.

Figure 2:
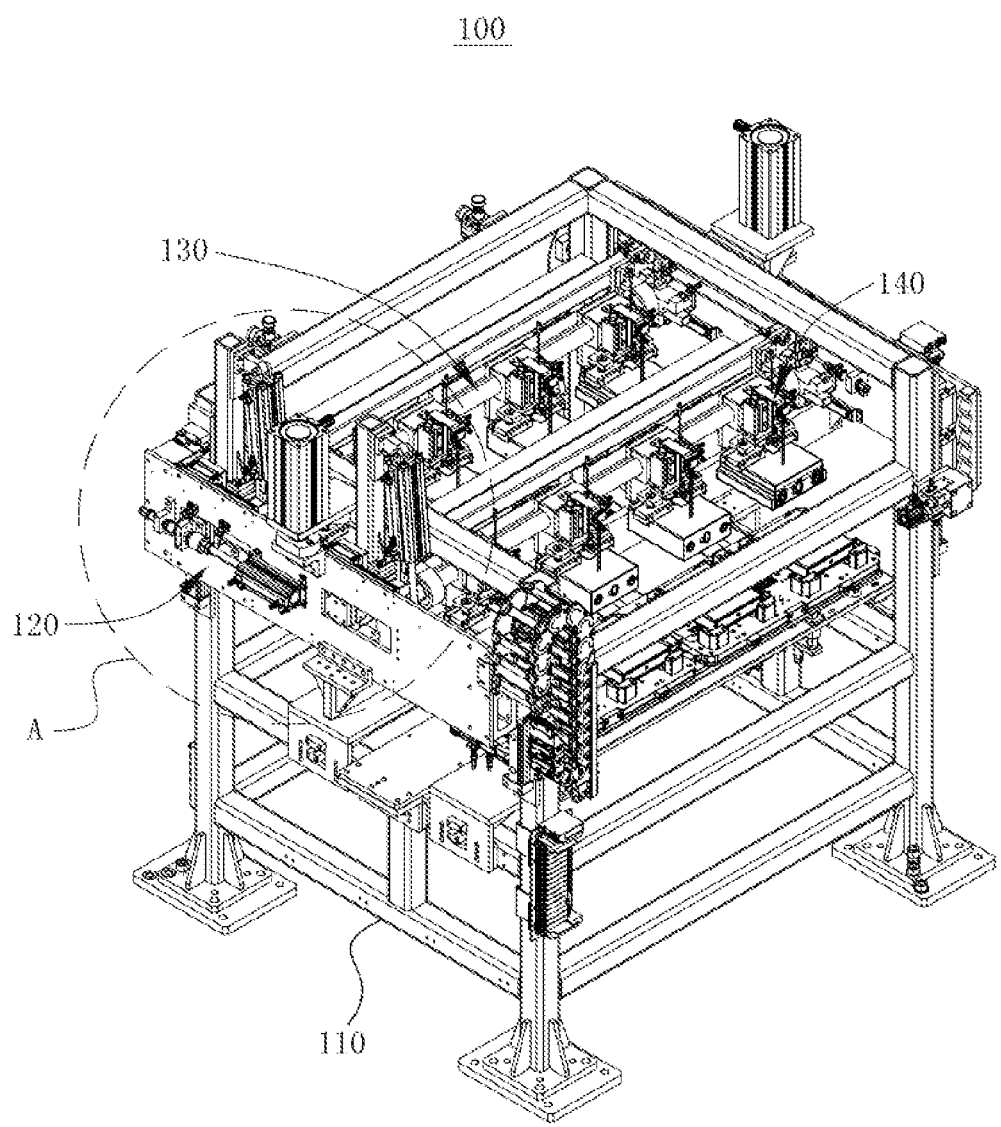
FIG. 2 is a schematic structural diagram of a first docking mechanism according to some embodiments of this application.

Referring to FIG. 1 and FIG. 2, in some embodiments, the first docking mechanism 100 further includes a first mobile assembly 120, where the first mobile assembly 120 is provided on the first base 110, the first flipping assembly 130 is provided on the first mobile assembly 120, and the first mobile assembly 120 is configured to be capable of driving the first flipping assembly 130 to move.

The first mobile assembly 120 is configured to drive the first flipping assembly 130 to move such that the first gripper assembly 140 provided on the first flipping assembly 130 can clamp and drive the battery cell 2000 for synchronous movement.

The first mobile assembly 120 may include a mobile drive structure and a mobile member, where the mobile drive structure may drive the mobile member to move relative to the first base 110, such that the mobile member drives the first flipping assembly 130 to move. Specifically, the mobile member may be, but is not limited to, a mobile bracket, a mobile plate, or a mobile block; and the mobile drive structure may be, but is not limited to, a cylinder, a hydraulic cylinder, or a drive motor.

The first mobile assembly 120 may be provided in a quantity of one, the first mobile assembly 120 can drive the first flipping assembly 130 to move; or the first mobile assembly 120 may be provided in plurality, where the plurality of first mobile assemblies 120 are connected to the first flipping assembly 130, and the plurality of first mobile assemblies 120 drive the first flipping assembly 130 to move, improving the stability of movement of the first flipping assembly 130. For example, the first mobile assembly 120 may be provided in a quantity of two, the two first mobile assemblies 120 are respectively provided at two opposite ends of the first base 110, the two opposite ends of the first flipping assembly 130 are respectively connected to the two first mobile assemblies 120, and the two first mobile assemblies 120 synchronously drive the first flipping assembly 130 to move smoothly.

With such layout, when the first gripper assembly 140 in the first attitude clamps the battery cell 2000, the first mobile assembly 120 can drive the first flipping assembly 130 and the first gripper assembly 140 to move, and the battery cell 2000 clamped by the first gripper assembly 140 can move synchronously, such that the battery cell 2000 can move to a predetermined position, and when the first flipping assembly 130 drives the first gripper assembly 140 to flip over to the second attitude, the first gripper assembly 140 can more accurately place the clamped battery cell 2000 onto the corresponding conveyor line 3000. Moreover, when the first flipping assembly 130 drives the first gripper assembly 140 to flip over to the second attitude, the first gripper assembly 140 releases the clamped battery cell 2000. At this point, the first mobile assembly 120 can drive the first gripper assembly 140 to move away from the battery cell 2000, achieving the purpose of placing the battery cell 2000 onto the conveyor line 3000.

Figure 3:
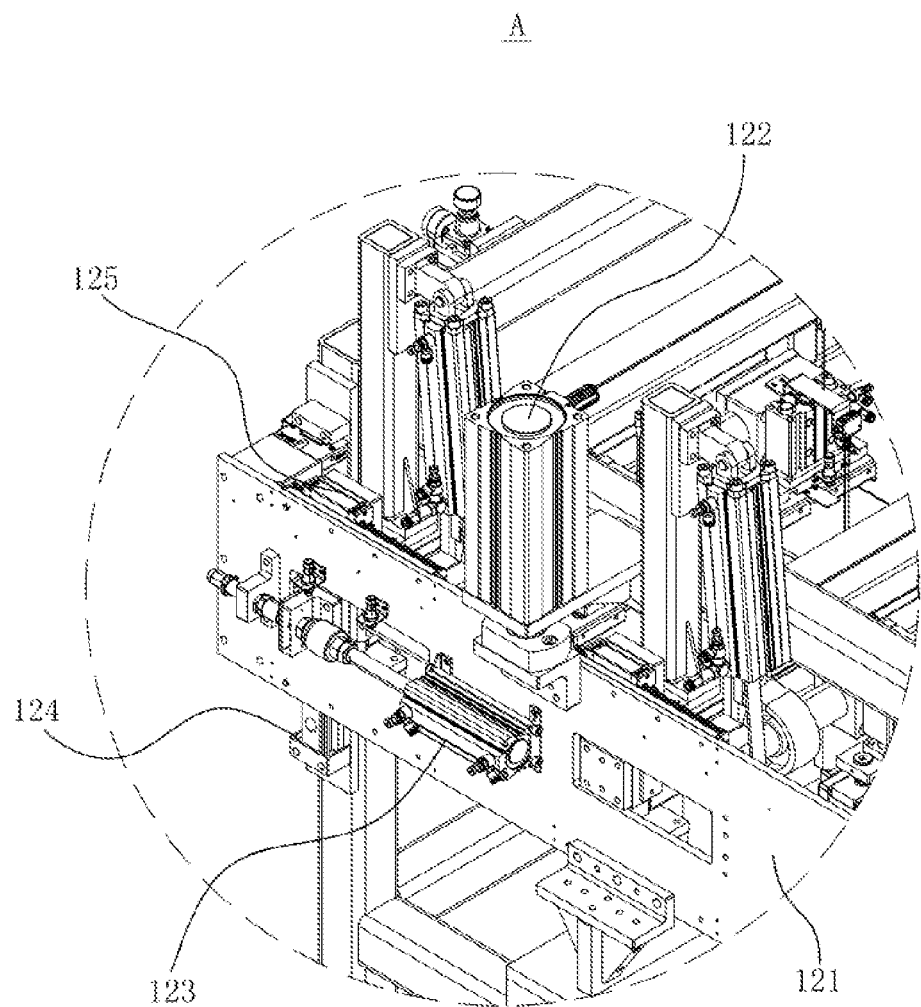
FIG. 3 is a locally enlarged schematic diagram of position A in FIG. 2.

Referring to FIG. 1 to FIG. 3, in some embodiments, the first mobile assembly 120 includes a mobile frame 121, a first mobile drive member 122, and a second mobile drive member 123, where the mobile frame 121 is movably connected to the first base 110, and the first flipping assembly 130 is movably connected to the mobile frame 121; the first mobile drive member 122 is provided on the first base 110, and an output end of the first mobile drive member 122 is connected to the mobile frame 121; and the second mobile drive member 123 is provided on the mobile frame 121, and an output end of the second mobile drive member 123 is connected to the first flipping assembly 130; where an output direction of the first mobile drive member 122 intersects with, in other words, is not parallel to, an output direction of the second mobile drive member 123.

The mobile frame 121 may be a mobile stand, a mobile flatbed frame, and the like. The mobile frame 121 is movably connected to the first base 110. Specifically, the mobile frame 121 may be slidably provided on the first base 110, or slidably provided on the first base 110 through a linear guide rail, a slide rail, a slider, or the like; or the mobile frame 121 may be inserted in the first base 110, and the mobile frame 121 is in sliding fit with the first base 110.

The first mobile drive member 122 is configured to drive the mobile frame 121 to move relative to the first base 110. Specifically, the first mobile drive member 122 may be, but is not limited to, a drive cylinder, a drive hydraulic cylinder, or a roller screw drive structure. For example, the drive cylinder is used as an example. The drive cylinder is fixedly mounted on the first base 110, a piston of the drive cylinder is connected to the mobile frame 121, and the drive cylinder can drive the mobile frame 121 to move on the first base 110 through extension and retraction of its piston.

The first flipping assembly 130 is movably connected to the mobile frame 121. Specifically, the first flipping assembly 130 may be slidably provided on the mobile frame 121, or slidably provided on the mobile frame 121 through a linear guide rail, a slide rail, a slider, and the like.

The second mobile drive member 123 is configured to drive the first flipping assembly 130 to move relative to the mobile frame 121. Specifically, the second mobile drive member 123 may be, but is not limited to, a drive cylinder, a drive hydraulic cylinder, and a roller screw drive structure. For example, the drive cylinder is used as an example. The drive cylinder is fixedly mounted on the mobile frame 121, a piston of the drive cylinder is connected to first flipping assembly 130, and the drive cylinder can drive first flipping assembly 130 to move on the mobile frame 121 through extension and retraction of its piston.

The output direction of the first mobile drive member 122 intersects with the output direction of the second mobile drive member 123, the first mobile drive member 122 can drive the mobile frame 121 and the first flipping assembly 130 to move along the output direction of the first mobile drive member 122, and the second mobile drive member 123 can drive the first flipping assembly 130 to move along the output direction of the second mobile drive member 123, in other words, the first flipping assembly 130 can move in at least two directions, such that the first gripper assembly 140 on the first flipping assembly 130 can clamp the battery cell 2000 to move in at least two directions.

With such layout, the first mobile drive member 122 can drive the mobile frame 121 to move relative to the first base 110, such that the first flipping assembly 130 synchronously moves with the mobile frame 121, the second mobile drive member 123 can drive the first flipping assembly 130 to move relative to the mobile frame 121, and in addition, the output direction of the first mobile drive member 122 intersects with the output direction of the second mobile drive member 123, in other words, the first flipping assembly 130 can move in at least two directions, such that the first gripper assembly 140 can clamp the battery cell 2000 to move in at least two directions. This effectively extends the range of movement adjustment for the battery cell 2000 by the first gripper assembly 140.

Referring to FIG. 1 to FIG. 3, in some embodiments, the output direction of the first mobile drive member 122 is perpendicular to the output direction of the second mobile drive member 123, and the first mobile drive member 122 is configured to be capable of driving the mobile frame 121 to move in the direction of gravity.

It can be understood that because the output direction of the first mobile drive member 122 is perpendicular to the output direction of the second mobile drive member 123, the first flipping assembly 130 can make position adjustment in a quantity of two mutually perpendicular directions, such that the first gripper assembly 140 on the first flipping assembly 130 can clamp the battery cell 2000 to move in the two mutually perpendicular directions, improving the convenience of adjusting the position of the battery cell 2000.

In addition, the first mobile drive member 122 can drive the mobile frame 121 to move in the direction of gravity, such that the first flipping assembly 130 can synchronously move with the mobile frame 121 in the direction of gravity, and the first gripper assembly 140 on the first flipping assembly 130 can clamp the battery cell 2000 to move in the direction of gravity toward or away from the conveyor line 3000, improving the accuracy of loading the battery cell 2000 onto the conveyor line 3000.

With such layout, the first mobile drive member 122 can drive the mobile frame 121 to move in the direction of gravity, so as to drive the first flipping assembly 130 and the first gripper assembly 140 to move in the direction of gravity closer to or away from the conveyor line 3000; the output direction of the second mobile drive member 123 is perpendicular to the output direction of the first mobile drive member 122, such that the second mobile drive member 123 can adjust positions of the first gripper assembly 140 and the battery cell 2000 clamped by the first gripper assembly 140 in a direction perpendicular to the direction of gravity; and when the first gripper assembly 140 is in the second attitude and releases the battery cell 2000, the second drive member can drive the first gripper assembly 140 in the direction away from the battery cell 2000, so as to place the released battery cell 2000 onto the conveyor line 3000.

Referring to FIG. 1 to FIG. 3, in some embodiments, the first mobile assembly 120 further includes a first guide member 124 and a second guide member 125, where the first guide member 124 is provided on the first base 110, the mobile frame 121 is connected to the first guide member 124, the mobile frame 121 is configured to be capable of sliding along the first guide member 124, the second guide member 125 is provided on the mobile frame 121, and the first flipping assembly 130 is configured to be capable of sliding along the second guide member 125.

The first guide member 124 may be, but is not limited to, a linear guide rail, a slide rail, or a slide groove. For example, the first guide member 124 being a linear guide rail is used for illustration. The linear guide rail is fixedly mounted on the first base 110, a piston of the linear guide rail is connected to the mobile frame 121, and the mobile frame 121 can slide on the first base 110 along the linear guide rail more smoothly under the driving of the first mobile drive member 122.

The second guide member 125 may be, but is not limited to, a linear guide rail, a slide rail, or a slide groove. For example, the second guide member 125 being a linear guide rail is used for illustration. The linear guide rail is fixedly mounted on the mobile frame 121, a piston of the linear guide rail is connected to the first flipping assembly 130, and the first flipping assembly 130 can slide on the mobile frame 121 along the linear guide rail more smoothly under the driving of the second mobile drive member 123.

With such layout, the mobile frame 121 can slide along the first guide member 124 under the driving of the first mobile drive member 122, effectively improving the stability of the mobile frame 121 during movement, and the first flipping assembly 130 can slide along the second guide member 125 under the driving of the second mobile drive member 123, effectively improving the stability of the first flipping assembly 130 during movement, thereby improving the stability of the first gripper assembly 140 when the first gripper assembly 140 clamps the battery cell 2000 to move.

Optionally, the first guide member 124 and the second guide member 125 are both linear guide rails, and their extension directions are perpendicular to each other.

For example, in some specific implementations, the first base 110 may be a frame structure, and the first mobile assembly 120 is provided in a quantity of two, and the two first mobile assemblies 120 are provided on two opposite ends of the first base 110, respectively. The first mobile assembly 120 includes a mobile flatbed frame, a first drive cylinder, a second drive cylinder, a first linear cylinder, and a second linear cylinder. The first linear cylinder is fixedly mounted on the first base 110 in the direction of gravity. The mobile flatbed frame is connected to a piston of the first linear cylinder. The first drive cylinder is fixedly mounted on the first base 110, and a piston of the first drive cylinder is connected to the mobile flatbed frame and can drive the mobile flatbed frame to move in the direction of gravity under the guiding effect of the first linear cylinder. The second linear cylinder is fixedly mounted on the mobile flatbed frame in a horizontal direction perpendicular to a conveying direction of the conveyor line 3000, where the conveying direction of the conveyor line 3000 herein is specifically a conveying direction of the conveyor line 3000 at the docking apparatus 1000. The two opposite ends of the first flipping assembly 130 are respectively connected to pistons of the second linear cylinders of the two first mobile assemblies 120. The second drive cylinder is fixedly mounted on the mobile flatbed frame, and a piston of the second drive cylinder is connected to the first flipping assembly 130 and can drive the first flipping assembly 130 to move in a direction perpendicular to the conveying direction of the conveyor line 3000 under the guiding effect of the second linear cylinder. Under the action of the first drive cylinder and the second drive cylinder, the first gripper assembly 140 can synchronously move with the first flipping assembly 130 in the direction of gravity or in a direction perpendicular to the conveying direction of the conveyor line 3000; and when the first gripper assembly 140 flips over to the second attitude, the first gripper assembly 140 can release the clamped battery cell 2000, and the second drive cylinder can drive the first flipping assembly 130 and the first gripper assembly 140 to move away from the battery cell 2000, such that the battery cell 2000 is released from the first gripper assembly 140 and placed onto the conveyor line 3000.

Referring to FIG. 1, FIG. 5, and FIG. 6, in some embodiments, the first flipping assembly 130 includes a support base 131, a flipping drive structure 132, and a flipping shaft 133, where the support base 131 is provided on the first base 110, the flipping drive structure 132 is provided on the support base 131, the flipping shaft 133 is connected to an output shaft of the flipping drive structure 132, the flipping drive structure 132 is configured to drive the flipping shaft 133 to rotate, and the first gripper assembly 140 is fixedly connected to the flipping shaft 133.

The support base 131 is a major structure of the first flipping assembly 130, the support base 131 may be, but is not limited to, a structure such as a support rod, a bracket, or a support block; or a support structure formed by a combination of at least one of a support rod, a bracket, a support block, and the like.

The flipping drive structure 132 is configured to drive the flipping shaft 133 to rotate, so as to enable the first gripper assembly 140 provided on the flipping shaft 133 to realize a flipping action. Specifically, the flipping drive structure 132 may be, but is not limited to, a drive cylinder, a drive hydraulic cylinder, or a drive motor.

The flipping shaft 133 is configured to rotate around its own axis under the driving of the flipping drive structure 132. Specifically, one or more first gripper assemblies 140 may be provided on the flipping shaft 133.

It can be understood that the flipping drive structure 132 can drive the flipping shaft 133 to rotate such that the flipping shaft 133 drives the first gripper assembly 140 to rotate; when the first gripper assembly 140 rotates to the second attitude, the center of gravity of the battery cell 2000 may be outside the first gripper assembly 140, or the direction of the center of gravity of the battery cell 2000 forms an included angle with the direction in which the first gripper assembly 140 supports the battery cell 2000. At this point, the first gripper assembly 140 releases the battery cell 2000, and the battery cell 2000 can slide out of the first gripper assembly 140 according to its own gravity and fall onto the conveyor line 3000, thereby realizing the purpose of loading.

With such layout, the flipping drive structure 132 can drive the flipping shaft 133 to rotate, such that the first gripper assembly 140 rotates with the flipping shaft 133 synchronously, and the first gripper assembly 140 can rotate to a first attitude or a second attitude, so as to realize attitude flipping of the battery cell 2000 clamped by the first gripper assembly 140.

Referring to FIG. 5 and FIG. 6, in some embodiments, the first flipping assembly 130 further includes a mounting bearing 134, where the mounting bearing 134 is provided on the support base 131, and the flipping shaft 133 is threaded through and rotationally connected to the mounting bearing 134.

It can be understood that the mounting bearing 134 is configured to support the rotation of the flipping shaft 133, and can reduce the friction coefficient during the movement of the flipping shaft 133 and ensure rotational accuracy of the flipping shaft 133.

Specifically, the mounting bearing 134 is fixedly mounted on the support base 131 through a fastener, and the flipping shaft 133 may be threaded through the mounting bearing 134 and connected to the flipping drive structure 132. The mounting bearing 134 may be provided in a quantity of one or more.

With such layout, the flipping shaft 133 can be provided on the support base 131 through the mounting bearing 134, effectively improving the stability of the mounting of the flipping shaft 133 and reducing the friction coefficient of the flipping shaft 133 during rotation.

Referring to FIG. 1, FIG. 5, and FIG. 6, in some embodiments, the flipping drive structure 132 includes a telescopic drive member 1321 and a connecting block 1322, where the connecting block 1322 is fixedly connected to the flipping shaft 133, the telescopic drive member 1321 is hingedly connected to the support base 131, and the output end of the telescopic drive member 1321 is hingedly connected to the connecting block 1322.

The telescopic drive member 1321 is configured to drive, through the expansion and contraction of a piston thereof, the connecting block 1322 to rotate around a central axis of the flipping shaft 133, so as to enable the flipping shaft 133 to synchronously rotate. Specifically, the telescopic drive member 1321 may be, but is not limited to, a cylinder or a hydraulic cylinder. The connecting block 1322 may, but is not limited to, a rectangular block, a spherical block, an L-shaped block, or a triangular block.

The telescopic drive member 1321 is hingedly connected to the support base 131, and the output end of the telescopic drive member 1321 is hingedly connected to the connecting block 1322, such that when the telescopic drive member 1321 drives the connecting block 1322 to rotate, the telescopic drive member 1321 can adaptively rotate around a position where it is hinged to the support base 131, so as to improve the applicability of the telescopic drive member 1321.

With such layout, the telescopic drive member 1321 can drive the connecting block 1322 through telescoping of the output end of the telescopic drive member 1321 to drive the connecting block 1322 to rotate around the flipping shaft 133, and the connecting block 1322 can also drive the flipping shaft 133 to synchronously rotate during rotation, so as to drive the first gripper assembly 140 to synchronously rotate around the flipping shaft 133.

Referring to FIG. 1, FIG. 5, and FIG. 6, in some embodiments, the connecting block 1322 protrudes towards the telescopic drive member 1321 to form an avoidance portion 13221, and the output end of the telescopic drive member 1321 is hingedly connected to the avoidance portion 13221.

It can be understood that the connecting block 1322 may protrude at its middle section to form the avoidance portion 13221, or the connecting block 1322 may have the avoidance portion 13221 formed at an end of the connecting block 1322 far from the flipping shaft 133, and the entire connecting block 1322 provided with the avoidance portion 13221 is of a bent structure or an arc-shaped structure, rather than a linear structure. The avoidance portion 13221 may be, but is not limited to, a bump, a boss, or a bent structure. When the entire connecting block 1322 is of a linear structure, and the connecting block 1322 rotates until the output direction of the telescopic drive member 1321 is nearly parallel to the connecting block 1322, the telescopic drive member 1321 interferes with a portion of the connecting block 1322 close to the flipping shaft 133, making it difficult to realize a larger angle of flipping.

With such layout, the output end of the telescopic drive member 1321 is hingedly connected to the avoidance portion 13221, and the telescopic drive member 1321 can drive the avoidance portion 13221 to rotate, so as to enable the connecting block 1322 to synchronously rotate. Compared with the case in which the output end of the telescopic drive member 1321 is directly hingedly connected to the connecting block 1322 of the linear structure, the telescopic drive member 1321 can drive the avoidance portion 13221 to rotate to a larger range before interfering with the flipping shaft 133, to be specific, the telescopic drive member 1321 has a larger output range, such that the telescopic drive member 1321 can drive the flipping shaft 133 to rotate at a larger angle, and in turn the first gripper assembly 140 has a larger range of movement and the battery cell 2000 also has a larger attitude adjustment range.

Referring to FIG. 6, in some embodiments, the first flipping assembly 130 further includes a buffer block 135 and a buffer limiting member 136, where the buffer block 135 is provided on the flipping shaft 133, the buffer limiting member 136 is provided on the support base 131, and the buffer limiting member 136 is configured to abut against the buffer block 135 when the first gripper assembly 140 has flipped over to the first attitude under driving of the flipping shaft 133.

The buffer limiting member 136 may be a flexible buffer structure, a buffer, or the like. For example, an oil pressure buffer is used as an example for illustration. The oil pressure buffer is fixedly mounted on the support base 131, and when the flipping shaft 133 drives the first gripper assembly 140 to flip over to the first attitude, the buffer block 135 connected to the flipping shaft 133 rotates synchronously and can abut against a piston of the oil pressure buffer, and the oil pressure buffer is used to realize buffer limiting for the rotation of the flipping shaft 133.

In some embodiments, the buffer limiting member 136 may alternatively be provided on the support base 131, and the buffer limiting member 136 is configured to abut against the buffer block 135 when the first gripper assembly 140 has flipped over to the second attitude under driving of the flipping shaft 133.

With such layout, when the flipping shaft 133 drives the first gripper assembly 140 to flip over to the second attitude, the buffer block 135 connected to the flipping shaft 133 rotates synchronously and can abut against a piston of the oil pressure buffer, and the oil pressure buffer is used to realize buffer limiting for the rotation of the flipping shaft 133.

Referring to FIG. 1, FIG. 5, and FIG. 6, in some embodiments, the first flipping assembly 130 further includes a controller and a position sensor 137, where the controller is electrically connected to the position sensor 137 and the flipping drive structure 132, the position sensor 137 is provided on the support base 131, and the position sensor 137 is configured to be capable of sensing the movement of the first gripper assembly 140 to the first attitude.

It can be understood that the position sensor 137 is configured to sense whether the first gripper assembly 140 has moved to the first attitude in place. Specifically, when the flipping drive structure 132 drives the flipping shaft 133 and the first gripper assembly 140 to flip over to the first attitude, if the first gripper assembly 140 has flipped over to the first attitude, at this point, the first gripper assembly 140 can move to the sensing range of the position sensor 137, the position sensor 137 can recognize that the first gripper assembly 140 has moved in place, and the position sensor 137 can send an electrical signal to the controller, such that the controller can send the electrical signal to the flipping drive structure 132 to cause the flipping drive structure 132 to stop working.

Specifically, the position sensor 137 may be an infrared sensor, a proximity sensor, or the like. The controller may be a control structure such as a microcontroller.

Referring to FIG. 1, FIG. 5, and FIG. 6, in some embodiments, the position sensor 137 is configured to be also capable of sensing the movement of the first gripper assembly 140 to the second attitude.

With such layout, the position sensor 137 is configured to sense whether the first gripper assembly 140 has moved to the second attitude in place. Specifically, when the flipping drive structure 132 drives the flipping shaft 133 and the first gripper assembly 140 to flip over to the second attitude, if the first gripper assembly 140 has flipped over to the second attitude, at this point, the first gripper assembly 140 can move to the sensing range of the position sensor 137, the position sensor 137 can recognize that the first gripper assembly 140 has moved in place, and the position sensor 137 can send an electrical signal to the controller, such that the controller can send the electrical signal to the flipping drive structure 132 to cause the flipping drive structure 132 to stop working.

For example, in some specific implementations, the first flipping assembly 130 includes a support base 131, a flipping cylinder, a connecting block 1322, a flipping shaft 133, and a mounting bearing 134. The support base 131 includes a crossbar and mounting blocks provided at two opposite ends of the crossbar, where the mounting block can be connected to the second guide member 125 described above; and the support base 131 further includes a cylinder mounting bracket, where the cylinder mounting bracket is fixed to the crossbar. The flipping cylinder is hingedly connected to the cylinder mounting bracket. The mounting bearing 134 is provided in a quantity of two, and the two mounting bearings 134 are both mounted on the crossbar. The flipping shaft 133 can be threaded through and mounted on the two mounting bearings 134; and a plurality of first gripper assemblies 140 are also fixedly mounted on the flipping shaft 133. The connecting block 1322 is fixedly mounted on the flipping shaft 133, the connecting block 1322 protrudes towards the flipping cylinder to form an avoidance portion 13221, and the flipping cylinder is hingedly connected to the avoidance portion 13221. The flipping cylinder can drive the connecting block 1322 and the avoidance portion 13221 to rotate around the central axis of the flipping shaft 133 through the extension and retraction of its piston, such that the connecting block 1322 drives the flipping shaft 133 to rotate, and the first gripper assembly 140 can synchronously rotate with the flipping shaft 133 and switch to the first attitude or the second attitude, so as to realize clamping of the battery cell 2000, attitude flipping and adjustment of the battery cell 2000, and loading of the battery cell 2000 to the conveyor line 3000.

Figure 8:
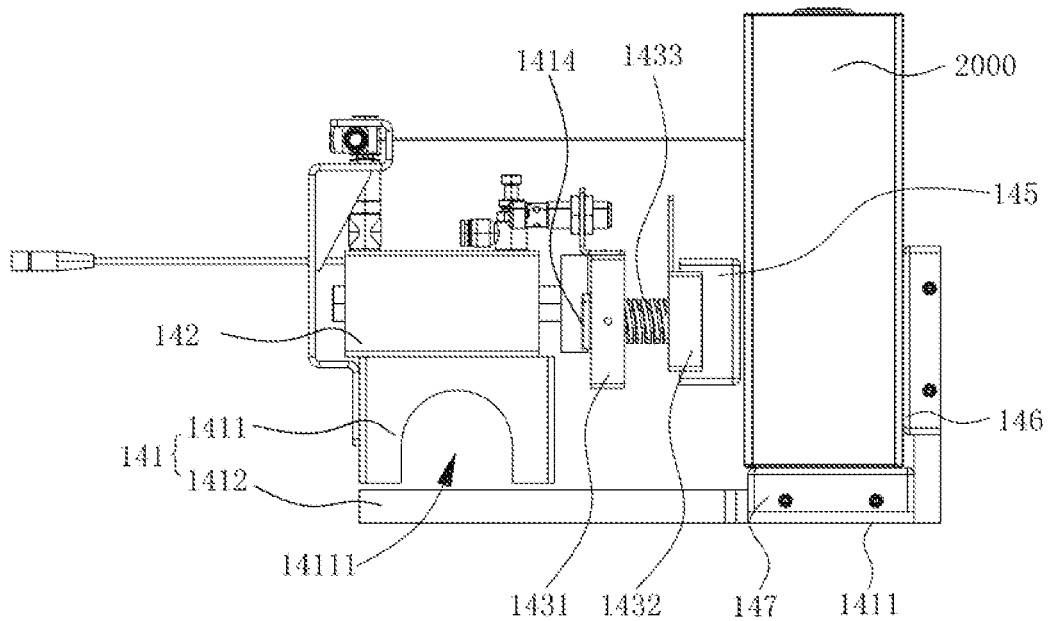
FIG. 8 is a side view of a first gripper assembly according to some embodiments of this application.

Referring to FIG. 1, FIG. 7, and FIG. 8, in some embodiments, the first gripper assembly 140 includes a holder 141, a gripper drive member 142, a gripper body 143, and a gripper fixing member 144, where the holder 141 is connected to the first flipping assembly 130, the gripper drive member 142 is provided on the holder 141, the gripper body 143 is connected to an output end of the gripper drive member 142, the gripper fixing member 144 is connected to the holder 141, and the gripper drive member 142 is configured to be capable of driving the gripper body 143 to reciprocate towards the gripper fixing member 144.

The holder 141 is connected to the first flipping assembly 130. Specifically, the holder 141 is fixedly connected to the flipping shaft 133 of the first flipping assembly 130. The holder 141 may be, but is not limited to, a structural member such as a fixing block, a fixing rod, a fixing bracket, or a fixing plate.

For example, in some specific implementations, the holder 141 may be formed by a fixing block 1411 and a fixing plate 1412 together. The fixing block 1411 is provided with an arc-shaped groove 14111, the fixing plate 1412 is fixedly connected to the fixing block 1411, and the fixing plate 1412 can cover the arc-shaped groove 14111 to form a connection hole for accommodating the flipping shaft 133. In addition, a circumferential side of the flipping shaft 133 includes an arc-shaped face and a flat face. When the flipping shaft 133 is accommodated in the connection hole, the arc-shaped face of the flipping shaft 133 is attached to the inner side wall of the arc-shaped groove 14111, and the flat face of the flipping shaft 133 is attached to the surface of the fixing plate 1412, such that when the flipping shaft 133 rotates, the flipping shaft 133 can drive the holder 141 to synchronously rotate.

The gripper drive member 142 may be, but is not limited to, a drive cylinder, a drive hydraulic cylinder, or a roller screw drive structure. The gripper drive member 142 is fixedly mounted on the holder 141, and an output end of the gripper drive member 142 is connected to the gripper body 143 such that the gripper body 143 can move in an output direction of the gripper drive member 142.

The gripper body 143 is configured to reciprocate towards the gripper fixing member 144 under the driving of the gripper drive member 142, so as to be capable of gripping the battery cell 2000 between the gripper body 143 and the gripper fixing member 144. Specifically, the gripper body 143 may be a block-shaped member, a column-shaped member, a plate-shaped member, or the like.

The gripper fixing member 144 may be, but is not limited to, a block-shaped member, a column-shaped member, or a plate-shaped member, and the gripper fixing member 144 is fixedly connected to the holder 141, such that when the gripper drive member 142 drives the gripper body 143 to move towards the gripper fixing member 144, the gripper body 143 can hold the battery cell 2000 against the gripper fixing member 144, so as to realize the clamping operation performed by the gripper body 143 and the gripper fixing member 144 on the battery cell 2000.

With such layout, the gripper drive member 142 can drive the gripper body 143 to move towards the gripper fixing member 144 so as to realize the purpose of clamping the battery cell 2000, and the holder 141 is connected to the first flipping assembly 130, such that the first flipping assembly 130 can drive the holder 141 to flip over, allowing the gripper body 143 and the gripper fixing member 144 to clamp the battery cell 2000 and flip over the battery cell 2000 for attitude adjustment.

Referring to FIG. 7 and FIG. 8, in some embodiments, the gripper body 143 and the gripper fixing member 144 are configured to clamp two opposite end faces of the battery cell 2000 in the thickness direction of the battery cell 2000.

For example, in this embodiment, a housing of the battery cell 2000 being rectangular is used as an example for illustration. The rectangular housing has a thickness, and thus a thickness of the battery cell 2000 is the thickness of the rectangular housing.

With such layout, the gripper body 143 and the gripper fixing member 144 can clamp the two opposite end faces of the battery cell 2000 in the thickness direction, and the width of the battery cell 2000 has no effect on the clamping effect of the gripper body 143 and the gripper fixing member 144, so the gripper body 143 and the gripper fixing member 144 can clamp battery cells 2000 of a variety of width specifications. This effectively improves the applicability of the first gripper assembly 140.

Referring to FIG. 7 and FIG. 8, in some embodiments, the gripper body 143 includes a first clamping block 1431, a second clamping block 1432, and a resilient buffer member 1433, where the first clamping block 1431 is connected to an output end of the gripper drive member 142, the second clamping block 1432 is slidably connected to the first clamping block 1431 along an output direction of the gripper drive member 142, the resilient buffer member 1433 is provided between the first clamping block 1431 and the second clamping block 1432, and two opposite ends of the resilient buffer member 1433 abut against the first clamping block 1431 and the second clamping block 1432, respectively.

The first clamping block 1431 is configured to connect to an output end of the gripper drive member 142, and the first clamping block 1431 may be, but is not limited to, a rectangular block, a circular block, or a block structure of another shape.

The second clamping block 1432 is slidably connected to the first clamping block 1431, and the second clamping block 1432 may be, but is not limited to, a rectangular block, a circular block, or a block structure of another shape.

The resilient buffer member 1433 is a resilient component. Specifically, the resilient buffer member 1433 may be a buffer spring, a resilient rubber pad, or the like.

For example, in some specific implementations, the first clamping block 1431 and the second clamping block 1432 may both be rectangular blocks, the first clamping block 1431 is provided with a through hole, the second clamping block 1432 has a sliding column protruding from the second clamping block 1432, the sliding column is inserted in the through hole and is in sliding fit with the through hole; and the resilient buffer member 1433 may be a buffer spring, the buffer spring is provided on the sliding column in a sleeving manner, and two opposite ends of the buffer spring abut against the first clamping block 1431 and the second clamping block 1432, respectively.

When the gripper drive member 142 drives the gripper body 143 to move to grip the battery cell 2000, the second clamping block 1432 abuts against the battery cell 2000, and the buffer spring is in a compressed state such that the second clamping block 1432 is subjected to an resilient force directed at the battery cell 2000, and the second clamping block 1432 stays in contact with the battery cell 2000 and can still slide towards the first clamping block 1431, thereby protecting the battery cell 2000 from being damaged by an excessive force when being clamped.

With such layout, the resilient buffer member 1433 is provided between the first clamping block 1431 and the second clamping block 1432, such that the resilient buffer member 1433 can provide buffering when the action of clamping the battery cell 2000 is performed, so as to reduce damage caused by overpressure to the battery cell 2000.

Referring to FIG. 7 and FIG. 8, in some embodiments, the holder 141 is provided with a support portion 1413, where the support portion 1413 is configured to be capable of bearing the battery cell 2000, and the gripper fixing member 144 is connected to the support portion 1413.

It can be understood that the support portion 1413 is configured to bear the battery cell 2000 such that the battery cell 2000 is born on the support portion 1413 and clamped by the gripper body 143 and the gripper fixing member 144, to be specific, three end faces of the battery cell 2000 are supported or clamped, effectively improving the stability of the clamping performed by the first gripper assembly 140 on the battery cell 2000.

For example, in some specific implementations, the holder 141 includes a fixing block 1411 and a fixing plate 1412, where one end of the fixing plate 1412 extends outward to form the support portion 1413, and the gripper fixing member 144 is fixedly mounted on an end of the support portion 1413 away from the fixing block. When an external battery cell 2000 is loaded into the first gripper assembly 140, the battery cell 2000 can be placed onto the support portion 1413, and then the gripper body 143 is driven by the gripper drive member 142 to move towards the gripper fixing member 144, such that the gripper body 143 holds the battery cell 2000 against the gripper fixing member 144, thereby clamping the battery cell 2000, and the support portion 1413 can exert a supporting force to the battery cell 2000 so as to improve the stability of the battery cell 2000 being clamped.

Referring to FIG. 7 and FIG. 8, in some embodiments, an end of the gripper body 143 facing the gripper fixing member 144 is covered with a first insulating member 145, an end of the gripper fixing member 144 facing the gripper body 143 is covered with a second insulating member 146, and an end face of the support portion 1413 on one side used to bear the battery cell 2000 is covered with a third insulating member 147.

The first insulating member 145 may be, but is not limited to, an insulating plate, an insulating mat, an insulating block, or an insulating film layer, and the first insulating member 145 is used to separate the gripper body 143 from the battery cell 2000, so as to reduce the risk of electric leakage of the battery cell 2000 through the gripper body 143.

The second insulating member 146 may be, but is not limited to, an insulating plate, an insulating mat, an insulating block, or an insulating film layer, and the second insulating member 146 is used to separate the gripper fixing member 144 from the battery cell 2000, so as to reduce the risk of electric leakage of the battery cell 2000 through the gripper fixing member 144.

The third insulating member 147 may be, but is not limited to, an insulating plate, an insulating mat, an insulating block, or an insulating film layer, and the third insulating member 147 is used to separate the support portion 1413 from the battery cell 2000, so as to reduce the risk of electric leakage of the battery cell 2000 through the support portion 1413.

With such layout, the first insulating member 145, the second insulating member 146, and the third insulating member 147 are in direct contact with the battery cell 2000 when the battery cell 2000 is clamped, thereby effectively reducing the probability of electric leakage.

Referring to FIG. 1, FIG. 7, and FIG. 8, in some embodiments, at least one of the first insulating member 145, the second insulating member 146, and the third insulating member 147 is flexible.

Specifically, the first insulating member 145 is flexible, the first insulating member 145 may be an insulating rubber flexible mat, an insulating foam layer, an insulating flexible sleeve, or the like, and the first insulating member 145 with flexibility can reduce the risk of the battery cell 2000 being scratched when the battery cell 2000 is clamped.

The second insulating member 146 is flexible, the second insulating member 146 may be an insulating rubber flexible mat, an insulating foam layer, an insulating flexible sleeve, or the like, and the second insulating member 146 with flexibility can reduce the risk of the battery cell 2000 being scratched when the battery cell 2000 is clamped.

The third insulating member 147 is flexible, the third insulating member 147 may be an insulating rubber flexible mat, an insulating foam layer, an insulating flexible sleeve, or the like, and the third insulating member 147 with flexibility can reduce the risk of the battery cell 2000 being scratched when the battery cell 2000 is clamped.

The first insulating member 145, the second insulating member 146, and the third insulating member 147 may all be flexible.

For example, in some specific implementations, the first gripper assembly 140 includes a holder 141, a drive cylinder, a gripper body 143, and a gripper fixing member 144. The holder 141 includes a fixing plate 1412 and a fixing block 1411 that is provided with an arc-shaped groove 14111. A portion of the fixing plate 1412 covers the arc-shaped groove 14111 and forms a connection hole for fixing the flipping shaft 133, and the other portion of the fixing plate 1412 extends beyond the fixing block 1411 to form a support portion 1413, where the support portion 1413 is connected to the gripper fixing member 144. The drive cylinder is mounted on the fixing block 1411, and a piston of the drive cylinder is provided toward the gripper fixing member 144. The gripper body 143 includes a first clamping block 1431, a second clamping block 1432, and a buffer spring. The first clamping block 1431 is connected to the piston of the drive cylinder, the first clamping block 1431 is provided with a through hole, the second clamping block 1432 protrudes to form a sliding column. The sliding column is inserted in the through hole and is in sliding fit with the through hole. A limiting structure 1414, for example, a limiting ring, is formed at a tail end of the sliding column, where the limiting structure 1414 is configured to prevent the sliding column from sliding out of the through hole. The sliding column is sleeved with a buffer spring, and two opposite ends of the buffer spring abut against the first clamping block 1431 and the second clamping block 1432, respectively.

When the operation of clamping the battery cell 2000 is performed, the drive cylinder extends the piston to drive the first clamping block 1431 and the second clamping block 1432 to move towards the gripper fixing member 144, the second clamping block 1432 can press the battery cell 2000 against the gripper fixing member 144, realizing clamping performed on the battery cell 2000, and the first clamping block 1431, the second clamping block 1432, and the buffer spring can realize overpressure protection for the battery cell 2000, eliminating the problem of damage to the battery cell 2000 due to excessive pressure.

In some embodiments, the first flipping assembly 130 is provided in plurality, and the first flipping assemblies 130 each are provided with the same number of the first gripper assemblies 140.

The first flipping assembly 130 included in the first docking mechanism 100 is provided in plurality such that the plurality of first flipping assemblies 130 can simultaneously perform a flipping action, and perform an attitude flipping operation on the first gripper assemblies 140 provided on each first flipping assembly 130, so as to realize the attitude flipping of battery cells 2000 and load the battery cells 2000 onto the conveyor lines 3000. The numbers of first gripper assemblies 140 provided on the various first flipping assemblies 130 are the same, such that the plurality of first flipping assemblies 130 can simultaneously load the same number of battery cells onto a plurality of conveyor lines 3000, effectively improving the flipping and loading efficiency of the battery cells 2000.

It can be understood that the plurality of first flipping assemblies 130 may alternatively perform the flipping action individually. For example, one of the plurality of first flipping assemblies 130 performs the flipping action to realize attitude flipping of the first gripper assemblies 140 provided on the first flipping assembly 130, and loads these attitude-flipped battery cells 2000 onto one of the conveyor lines 3000. Others of the plurality of first flipping assemblies 130 keep still without performing the loading operation. In this way, with each of the plurality of first flipping assemblies 130 performing the flipping action individually, selective loading can be realized for one or any of the conveyor lines 3000, thereby realizing configuration of the numbers of the battery cells 2000 on the conveyor lines 3000.

Figure 4:
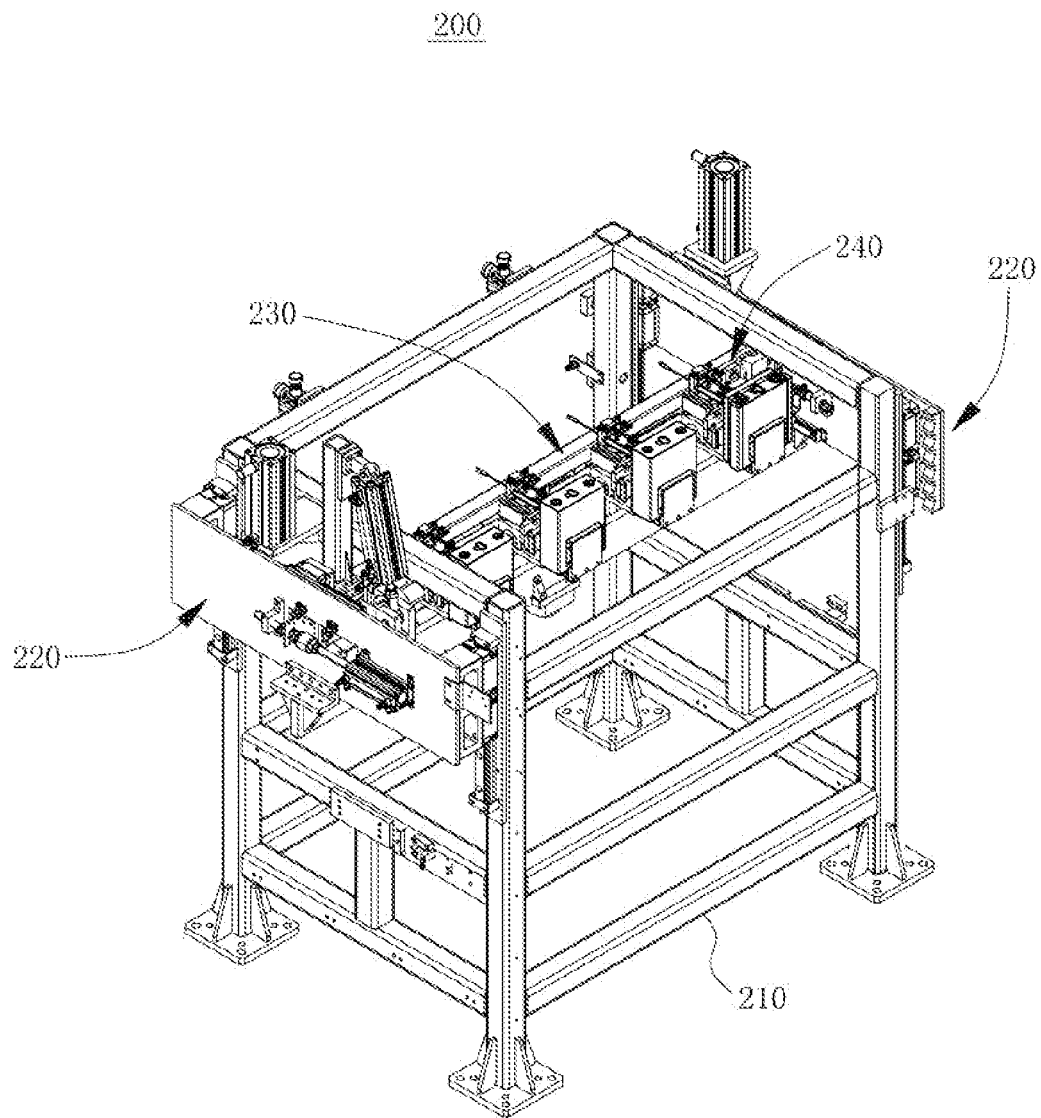
FIG. 4 is a schematic structural diagram of a second docking mechanism according to some embodiments of this application.

Referring to FIG. 1, FIG. 2, and FIG. 4, in some embodiments, the docking apparatus 1000 further includes a second docking mechanism 200, where the first docking mechanism 100 and the second docking mechanism 200 both are located on a conveying path of the conveyor line 3000; the second docking mechanism 200 includes a second base 210, a second mobile assembly 220, a second flipping assembly 230, and a second gripper assembly 240; and the first docking mechanism 100 includes N first flipping assemblies 130, and the second docking mechanism 200 includes less than N second flipping assemblies 230, where N is the number of conveyor lines 3000, and N is an integer greater than or equal to 2.

The conveying path of the conveyor line 3000 is a path through which the conveyor line 3000 conveys a battery cell 2000. The first docking mechanism 100 and the second docking mechanism 200 are both provided on the conveying path of the conveyor line 3000, in other words, both the first docking mechanism 100 and the second docking mechanism 200 can flip an external battery cell 2000 over and load the external battery cell 2000 onto the conveyor line 3000.

It can be understood that the first docking mechanism 100 includes N first flipping assemblies 130, where N is the number of conveyor lines 3000. In this case, the N first flipping assemblies 130 in the first docking mechanism 100 can be used to perform synchronous loading for N conveyor lines 3000, and each first flipping assembly 130 can perform attitude flipping and loading operations for the corresponding conveyor line 3000, so as to ensure the loading efficiency of the battery cells 2000.

The second docking mechanism 200 includes a second base 210, a second mobile assembly 220, a second flipping assembly 230, and a second gripper assembly 240. It can be understood that the second base 210, the second mobile assembly 220, the second flipping assembly 230, and the second gripper assembly 240 herein have the same structure and connection relationship as the first base 110, the first mobile assembly 120, the first flipping assembly 130, and the first gripper assembly 140. The definitive descriptions of "first" and "second" are only for the purpose of distinguishing whether the base, the mobile assembly, the flipping assembly, and the gripper assembly are located on the first docking mechanism 100 or the second docking mechanism 200, so as to facilitate intuitive understanding. Therefore, for the specific structures of the second base 210, the second mobile assembly 220, the second flipping assembly 230, and the second gripper assembly 240, reference may be made to the previous descriptions of the first base 110, the first mobile assembly 120, the first flipping assembly 130, and the first gripper assembly 140. The specific structures of the second base 210, the second mobile assembly 220, the second flipping assembly 230, and the second gripper assembly 240 are not repeated herein.

It can be understood that in the production process of the battery, there is a need to perform a pre-stacking operation on battery cells 2000 on the conveyor line 3000, and according to the configuration of the battery, a corresponding number of battery cells 2000 are taken out of the conveyor line 3000. For example, when the battery produced includes 13 battery cells 2000 in the configuration, 13 battery cells 2000 are taken out of the N conveyor lines 3000 in the pre-stacking process. Assuming that N is 2, 13 battery cells 2000 are taken out of two conveyor lines 3000, and the numbers of the battery cells 2000 on the two conveyor lines 3000 are different.

Based on this, the second docking mechanism 200 includes any number of second flipping assemblies 230 less than N. Specifically, on the basis that the first docking mechanism 100 can synchronously load the N conveyor lines 3000, a replenishment operation can be performed on the conveyor lines 3000 by using the less than N second flipping assemblies 230 in the second docking mechanism 200. When there is a difference in the numbers of battery cells 2000 on the conveyor lines 3000, the less than N second flipping assemblies 230 in the second docking mechanism 200 can perform a replenishment operation, such that the numbers of battery cells 2000 on the conveyor lines 3000 can be configured to ensure the normal operation of the subsequent processes.

It should be understood that the first docking mechanism 100 can also perform a replenishment operation, using one or more of the N first flipping assemblies 130 to drive the corresponding first gripper assembly(-ies) 140 to rotate, so as to cause the first gripper assembly(-ies) 140 to flip over and release the battery cells 2000, and to cause the battery cells 2000 to be loaded onto one or more conveyor lines 3000 that need to be replenished. However, when the first docking mechanism 100 is used to perform both a loading operation and a replenishment operation, when the first docking mechanism 100 is replenishing battery cells, the loading pace of the first docking mechanism 100 stops, and after the replenishment operation is completed, the first docking mechanism 100 continues to perform a loading operation for each conveyor line 3000. In this case, the first docking mechanism 100 performing both the loading operation and the replenishment operation will affect the loading efficiency of the battery cells 2000. Therefore, the docking apparatus 1000 further includes a second docking mechanism 200. The second docking mechanism 200 is used to perform the replenishment operation, the first docking mechanism 100 is only used to perform the loading operation, such that the loading efficiency of the battery cells 2000 is ensured, the second docking mechanism 200 can also perform the replenishment operation, and one of the plurality of conveyor lines 3000 with a small number of battery cells 2000 is replenished, so as to ensure that the loading operation of the first docking mechanism 100 does not stop.

Referring to FIG. 1 and FIG. 2, in some embodiments, the first flipping assembly 130 is provided in a quantity of two, and the second flipping assembly 230 is provided in a quantity of one.

With such layout, the two first flipping assemblies 130 can be used to drive the first gripper assemblies 140 thereon for flipping and loading, and the second flipping assembly 230 can be used to drive the second gripper assembly 240 thereon for flipping and replenishment, such that the first flipping assemblies 130 and the first gripper assemblies 140 can guarantee the loading efficiency and the second flipping assembly 230 and the second gripper assembly 240 can perform a replenishment operation for the conveyor line 3000, so as to ensure that the conveyor lines 3000 each have sufficient battery cells 2000 to avoid affecting the subsequent processes.

For example, in some specific implementations, the number of conveyor lines 3000 is two, the first docking mechanism 100 includes two first flipping assemblies 130, and the second docking mechanism 200 includes one second flipping assembly 230. The two flipping assemblies in the first docking mechanism 100 can drive the first gripper assemblies 140 to perform attitude flipping, to grip, flip over, and load externally loaded battery cells 2000 onto the corresponding two conveyor lines 3000 for conveying. In the subsequent pre-stacking process, if an odd number of battery cells 2000 need to be stacked according to the configuration of the battery to be produced. For example, a battery with a configuration of 13 battery cells 2000 is used as an example for illustration. After six battery cells 2000 are taken out from each of the two conveyor lines 3000, the number of battery cells 2000 taken is 12, and at this point, one battery cell 2000 needs to be taken out from one of the conveyor lines 3000. In this case, the numbers of battery cells 2000 on the two conveyor lines 3000 have a difference. To ensure the normal progress of the various processes on the conveyor lines 3000, the second docking mechanism 200 may be used for replenishment. The one second flipping assembly 230 in the second docking mechanism 200 can flip over an external battery cell 2000 and load it onto one conveyor line 3000 to configure the numbers of battery cells 2000 on the conveyor lines 3000, ensuring the normal progress of the subsequent processes.

It can be understood that the numbers of first gripper assemblies 140 provided on the various first flipping assemblies 130 are the same, and each first flipping assembly 130 can be provided with one or more first gripper assemblies 140.

The second gripper assembly 240 provided on the second flipping assembly 230 may be provided in a quantity of one or more. Specifically, the number of second gripper assemblies 240 provided on the second flipping assembly 230 may be the same as the number of second gripper assemblies 240 provided on the first flipping assembly 130.

Referring to FIG. 1, an embodiment of this application provides a battery production line 10 including the foregoing docking apparatus 1000, a gripping device 4000, a conveyor line 3000, and a stacking apparatus 5000, where the gripping device 4000 is configured to transfer a battery cell 2000 to a first gripper assembly 140 in a first attitude, and the conveyor line 3000 is configured to transfer the battery cell 2000 released by the first gripper assembly 140 in a second attitude, the stacking apparatus 5000 is provided downstream of the docking apparatus 1000 in a conveying direction of the conveyor line 3000, and the stacking apparatus 5000 is configured to be capable of pre-stacking battery cells 2000 on the conveyor line 3000.

The gripping device 4000 may be a manipulator, a gripping robot, or the like.

The conveyor line 3000 is used to transfer the battery cells 2000 such that different processes on the battery cells 2000 are completed on the conveyor path. It can be understood that the conveyor line 3000 is provided with a tray for conveying the battery cell 2000 in a flat lying state. Specifically, the conveyor line 3000 may be provided in a quantity of one, two, or more. Two conveyor lines 3000 are used as an example for illustration. The two conveyor lines 3000 can convey the battery cells 2000, and the docking apparatus 1000 can flip over upright battery cells 2000 gripped by the gripping device 4000 and place them onto the two conveyor lines 3000 for the normal progress of the subsequent battery production and processing processes.

The stacking apparatus 5000 is configured to pre-stack batteries according to the configuration of the battery to be produced. For example, when the configuration of the battery to be produced is 13 battery cells 2000, the stacking apparatus 5000 takes out 13 battery cells 2000 from the conveyor lines 3000 for pre-stacking; and when the configuration of the battery to be produced is 16 battery cells 2000, the stacking apparatus 5000 takes out 16 battery cells 2000 from the conveyor lines 3000 for pre-stacking.

With the battery production line 10 provided in this embodiment of this application, the gripping device 4000 can load external battery cells 2000 to the docking apparatus 1000, the first gripper assembly 140 of the docking apparatus 1000 clamps the battery cells in a first attitude, and the first gripper assembly 140 can flip over to a second attitude to load the battery cells 2000 onto corresponding conveyor lines 3000, to adjust the attitudes of the battery cells 2000 and load them onto the conveyor lines 3000; and the stacking apparatus 5000 can perform a pre-stacking operation on battery cells 2000 downstream in the conveying direction of the conveyor line 3000. The battery production line 10 of this embodiment of this application includes the foregoing docking apparatus 1000. On the basis that the docking apparatus 1000 can take place of a plurality of manipulators to step-by-step perform the operations of gripping, flipping over, and placing onto the conveyor line so as to improve the loading efficiency of battery cells 2000 onto the conveyor lines 3000, the battery production line of this embodiment of this application has a better loading efficiency, and thus the efficiency of battery production is also improved.

It can be understood that in this embodiment, the docking apparatus 1000 in the battery production line 10 may include the first docking mechanism 100 and the second docking mechanism 200, where the first gripper assemblies 140 in the first docking mechanism 100 and the second gripper assembly 240 in the second docking mechanism 200 can call grip battery cells 2000 in the first attitude, and the first gripper assemblies 140 can be flipped over to the second attitude to load materials for the N conveyor lines 3000, and the second gripper assembly 240 can be flipped over to the second attitude to replenish one of the N conveyor lines 3000 in which the number of battery cells 2000 conveyed is smaller. In this way, on the basis of guaranteeing that loading is not affected, the second gripper assembly 240 can perform a replenishing operation for the conveyor lines 3000, effectively ensuring that the conveyor lines 3000 can convey sufficient amounts of battery cells 2000.

For example, when the number of conveyor lines 3000 is two, if the configuration of the battery to be produced is an odd number of battery cells 2000, the stacking apparatus 5000 takes out different numbers of battery cells 2000 from the two conveyor lines 3000, resulting in a difference in the numbers of battery cells 2000 on the two conveyor lines 3000, and thus a replenishment operation needs to be performed on the conveyor line 3000 that has a lesser number of battery cells 2000. Under the condition that the docking apparatus 1000 includes only the first docking mechanism 100, the first flipping assembly 130 can be used to drive the first gripper assembly 140 to flip over to implement both loading and replenishing; and under the condition that the docking apparatus 1000 includes the first docking mechanism 100 and the second docking mechanism 200, the first docking mechanism 100 can be used to perform the loading operation, and the second docking mechanism 200 can be used to perform the replenishing operation. On the basis of not affecting the loading efficiency of the battery cells 2000, it is possible to perform the replenishment operation on a conveyor line 3000 that conveys a lesser number of battery cells 2000.

Referring to FIG. 1, in some embodiments, the gripping device 4000 includes a plurality of gripping assemblies, the number of the conveyor lines 3000 is in plurality, and the number of the gripping assemblies is the same as the number of the conveyor lines 3000.

It can be understood that the gripping assembly is a structural member for clamping an external battery cell 2000, the gripping assembly may include a plurality of grippers controlled by a drive structure, and the drive structure is used to control the grippers to grip the battery cell.

For example, the gripping device 4000 may include a manipulator and a gripping assembly, where the manipulator may drive the gripping assembly to move to grip an external battery cell 2000, or drive the gripping assembly to move to the docking apparatus 1000 to place the battery cell 2000 into the first gripper assembly 140.

With such layout, the plurality of gripper assemblies can simultaneously grip a plurality of sets of battery cells 2000, and load the plurality of sets of battery cells 2000 into the first gripper assemblies 140 of the plurality of first flipping assemblies 130, such that the plurality of first flipping assemblies 130 can drive the corresponding first gripper assemblies 140 to flip over and load the materials to corresponding conveyor lines 3000, effectively improving the loading efficiency.

Referring to FIG. 1 and FIG. 9, an embodiment of this application provides a battery cell 2000 loading method, where the loading method is applied to the foregoing battery production line 10, and the loading method includes:

docking battery cells 2000, where a gripping device 4000 grips battery cells 2000 from outside and places them into a docking apparatus 1000, and the docking apparatus 1000 moves and flips over the battery cells 2000 onto corresponding conveyor lines 3000;

pre-stacking the battery cells 2000, where the stacking apparatus 5000 pre-stacks the battery cells 2000 on the conveyor lines 3000; and replenishing a battery cell 2000, where when the number of battery cells 2000 pre-stacked by the stacking apparatus 5000 on any one of the conveyor lines 3000 reaches a predetermined value, the gripping device 4000 grips a battery cell 2000 from outside and places it into the docking apparatus 1000, and the docking apparatus 1000 moves and flips over the battery cell 2000 onto the conveyor line 3000.

The stacking apparatus 5000 is configured to pre-stack battery cells 2000 on the conveyor lines 3000. Specifically, the stacking apparatus 5000 is configured to pre-stack a specific number of battery cells 2000 into a group according to the configuration of battery to be produced.

The predetermined value of the pre-stacked number of battery cells 2000 refers to the number of battery cells 2000 in the stacking apparatus 5000 according to the configuration of battery to be produced.

It can be understood that in the step of pre-stacking battery cells 2000, the specific operation of the stacking apparatus 5000 for pre-stacking the battery cells 2000 on the conveyor lines 3000 is that: the stacking apparatus 5000 takes out a specific number of battery cells 2000 according to the configuration of battery to be produced, and then performs a pre-stacking operation of the specific number of battery cells 2000. As a result, the numbers of battery cells 2000 taken out from the conveyor lines may be different. For example, when the number of battery cells 2000 taken out is an odd number, at this point the numbers of battery cells 2000 on the conveyor lines 3000 may differ, and therefore there is a need to configure the numbers of battery cells 2000 on the conveyor lines 3000 by using the step of replenishing battery cells 2000, such that the conveyor lines 3000 each have a sufficient amount of battery cells 2000, avoiding affecting the subsequent pre-stacking process or other processes.

With the method for configuring battery cells 2000 provided in this embodiment of this application, the stacking apparatus 5000 pre-stacks battery cells 2000 on conveyor lines 3000. When the number of battery cells stacked by the stacking apparatus 5000 according to the configuration reaches a predetermined value, the number of battery cells 2000 on one conveyor line 3000 is less than the number of battery cells 2000 on another conveyor line 3000. In this case, a battery cell 2000 can be gripped by the gripping device 4000 from outside and put into the docking apparatus 1000, and the docking apparatus 1000 moves the battery cell 2000 and flips it over onto the conveyor line 3000 so as to implement battery cell 2000 replenishment. Such configuration of the numbers of battery cells 2000 on the conveyor lines 3000 avoids affecting the pre-stacking process.

In some embodiments, the docking apparatus 1000 includes a first docking mechanism 100 and a second docking mechanism 200, where the first docking mechanism 100 includes N first flipping assemblies 130, the flipping assemblies 130 each are provided with the same number of first gripper assemblies 140, the second docking mechanism 200 includes one second flipping assembly 230, and the second flipping assembly 230 is provided with several second gripper assemblies 240;

in the step of docking battery cells 2000, the gripping device 4000 grips battery cells 2000 from outside and places them into the first gripper assemblies 140 in a first attitude, the first gripper assemblies 140 flip over to a second attitude, and the first gripper assemblies 140 place the battery cells 2000 onto corresponding conveyor lines 3000; and in the step of replenishing battery cells 2000, the gripping device 4000 grips a battery cell 2000 from outside and places it into the second gripper assembly 240 in a first attitude, the second gripper assembly 240 flips over to a second attitude, and the second gripper assembly 240 places the battery cell 2000 onto a conveyor line 3000 on which the number of the battery cells 2000 pre-stacked has reached a predetermined value.

The first docking mechanism 100 can use N first flipping assemblies 130 to simultaneously flip battery cells 2000 over for loading the battery cells 2000 onto N conveyor lines 3000, so as to guarantee the loading efficiency of the battery cells 2000. In addition, the second docking mechanism 200 can use one second flipping assembly 230 to perform loading on any one conveyor line 3000 of a lesser number of battery cells 2000 according to configuration, such that the second flipping assembly 230 drives the second gripper assemblies 240 to flip over to perform replenishment according to configuration while guaranteeing the loading efficiency of the battery cells 2000. This effectively improves the production efficiency of the batteries.

The foregoing descriptions are merely some embodiments of this application, but are not intended to limit this application. Any modification, equivalent replacement, or improvement made without departing from the spirit and principle of this application shall fall within the protection scope of this application.

What is claimed is:

1. A docking apparatus, configured to load a battery cell onto a conveyor line, comprising:
    a first docking mechanism, wherein the first docking mechanism comprises:
      a first base;
      a first flipping assembly, provided on the first base and comprising:
        a support base provided on the first base;
        a flipping drive structure provided on the support base;
        a flipping shaft connected to an output shaft of the flipping drive structure, wherein the flipping drive structure is configured to drive the flipping shaft to rotate;
        a buffer block provided on the flipping shaft; and
        a buffer limiting member provided on the support base; and
      a first gripper assembly, provided on the first flipping assembly and fixedly connected to the flipping shaft;
      wherein the first flipping assembly is configured to be capable of driving the first gripper assembly to flip over to a first attitude or a second attitude, the first gripper assembly grips the battery cell in the first attitude and loads the battery cell onto the conveyor line in the second attitude, and the buffer limiting member is configured to abut against the buffer block when the first gripper assembly has flipped over to the first attitude and/or the second attitude under driving of the flipping shaft.

2. The docking apparatus according to claim 1, wherein the first gripper assembly is configured to grip the battery cell along a thickness direction of the battery cell.

3. The docking apparatus according to claim 1, wherein the first docking mechanism further comprises a first mobile assembly, wherein the first mobile assembly is provided on the first base, the first flipping assembly is provided on the first mobile assembly, and the first mobile assembly is configured to be capable of driving the first flipping assembly to move.

4. The docking apparatus according to claim 3, wherein: the first mobile assembly comprises:
    a mobile frame movably connected to the first base, wherein the first flipping assembly is movably connected to the mobile frame;
    a first mobile drive member provided on the first base, wherein an output end of the first mobile drive member is connected to the mobile frame; and
    a second mobile drive member provided on the mobile frame, wherein an output end of the second mobile drive member is connected to the first flipping assembly; and
    wherein an output direction of the first mobile drive member intersects an output direction of the second mobile drive member.

5. The docking apparatus according to claim 4, wherein the output direction of the first mobile drive member is perpendicular to the output direction of the second mobile drive member, and the first mobile drive member is configured to be capable of driving the mobile frame to move in the direction of gravity.

6. The docking apparatus according to claim 3, wherein the first mobile assembly further comprises:
    a first guide member provided on the first base, wherein the mobile frame is connected to the first guide member, and the mobile frame is configured to be capable of sliding along the first guide member; and
    a second guide member provided on the mobile frame, wherein the first flipping assembly is configured to be capable of sliding along the second guide member.

7. The docking apparatus according to claim 1, wherein the first flipping assembly further comprises a mounting bearing, wherein the mounting bearing is provided on the support base, and the flipping shaft is threaded through and rotationally connected to the mounting bearing.

8. The docking apparatus according to claim 1, wherein the flipping drive structure comprises a telescopic drive member and a connecting block, wherein the connecting block is fixedly connected to the flipping shaft, the telescopic drive member is hingedly connected to the support base, and an output end of the telescopic drive member is hingedly connected to the connecting block.

9. The docking apparatus according to claim 8, wherein the connecting block protrudes towards the telescopic drive member to form an avoidance portion, and the output end of the telescopic drive member is hingedly connected to the avoidance portion.

10. The docking apparatus according to claim 1, wherein the first flipping assembly further comprises a controller and a position sensor, wherein the controller is electrically connected to the position sensor and the flipping drive structure, the position sensor is provided on the support base, and the position sensor is configured to be capable of sensing the movement of the first gripper assembly to the first attitude and/or the second attitude.

11. The docking apparatus according to claim 1, wherein the first gripper assembly comprises:
    a holder connected to the first flipping assembly;
    a gripper drive member provided on the holder;
    a gripper body connected to an output end of the gripper drive member; and
    a gripper fixing member connected to the holder, wherein the gripper drive member is configured to be capable of driving the gripper body to reciprocate towards the gripper fixing member.

12. The docking apparatus according to claim 11, wherein the gripper body and the gripper fixing member are configured to grip two opposite end faces of the battery cell in the thickness direction of the battery cell.

13. The docking apparatus according to claim 11, wherein the gripper body comprises:
    a first clamping block connected to the output end of the gripper drive member;
    a second clamping block slidably connected to the first clamping block in an output direction of the gripper drive member; and
    a resilient buffer member provided between the first clamping block and the second clamping block, wherein two opposite ends of the resilient buffer member abut against the first clamping block and the second clamping block, respectively.

14. The docking apparatus according to claim 11, wherein the holder is provided with a support portion, wherein the support portion is configured to be capable of bearing the battery cell, and the gripper fixing member is connected to the support portion.

15. The docking apparatus according to claim 14, wherein an end of the gripper body facing the gripper fixing member is covered with a first insulating member, an end of the gripper fixing member facing the gripper body is covered with a second insulating member, and an end face of the support portion on one side used to carry the battery cell is covered with a third insulating member.

16. The docking apparatus according to claim 15, wherein at least one of the first insulating member, the second insulating member, and the third insulating member is flexible.

17. The docking apparatus according to claim 1, wherein the first flipping assembly is provided in plurality, and the plurality of first flipping assemblies each are provided with the same number of the first gripper assemblies.

18. The docking apparatus according to claim 17, further comprising:
    a second docking mechanism;
    wherein:
        the first docking mechanism and the second docking mechanism both are located on a conveying path of the conveyor line;
        the second docking mechanism comprises a second base, a second mobile assembly, a second flipping assembly, and a second gripper assembly; and
        the first docking mechanism comprises N first flipping assemblies, and the second docking mechanism comprises less than N second flipping assemblies, wherein N is a number of conveyor lines, and N is an integer greater than or equal to 2.

19. A docking apparatus, configured to load a battery cell onto a conveyor line, comprising:
    a first docking mechanism, wherein the first docking mechanism comprises:
        a first base;
        a first flipping assembly, provided on the first base and comprising:
            a support base provided on the first base;
            a flipping drive structure provided on the support base;

a flipping shaft connected to an output shaft of the flipping drive structure, wherein the flipping drive structure is configured to drive the flipping shaft to rotate; and a controller and a position sensor, wherein the controller is electrically connected to the position sensor and the flipping drive structure, and the position sensor is provided on the support base; and a first gripper assembly, provided on the first flipping assembly and fixedly connected to the flipping shaft;

wherein the first flipping assembly is configured to be capable of driving the first gripper assembly to flip over to a first attitude or a second attitude, the first gripper assembly grips the battery cell in the first attitude and loads the battery cell onto the conveyor line in the second attitude, and the position sensor is configured to be capable of sensing the movement of the first gripper assembly to the first attitude and/or the second attitude.

20. A docking apparatus, configured to load a battery cell onto a conveyor line, comprising:

a first docking mechanism, wherein the first docking mechanism comprises:

a first base;

a first flipping assembly, provided on the first base; and a first gripper assembly, provided on the first flipping assembly and comprising:

a holder connected to the first flipping assembly, wherein the holder is provided with a support portion, and the support portion is configured to be capable of bearing the battery cell;

a gripper drive member provided on the holder;

a gripper body connected to an output end of the gripper drive member; and a gripper fixing member connected to the holder, wherein the gripper drive member is configured to be capable of driving the gripper body to reciprocate towards the gripper fixing member, and the gripper fixing member is connected to the support portion;

wherein the first flipping assembly is configured to be capable of driving the first gripper assembly to flip over to a first attitude or a second attitude, the first gripper assembly grips the battery cell in the first attitude and loads the battery cell onto the conveyor line in the second attitude, an end of the gripper body facing the gripper fixing member is covered with a first insulating member, an end of the gripper fixing member facing the gripper body is covered with a second insulating member, and an end face of the support portion on one side used to carry the battery cell is covered with a third insulating member.

* * * * *